Jan. 30, 1945.   H. P. VON KNAUF   2,368,389
APPARATUS FOR MAKING ELECTRICAL COILS
Filed Oct. 28, 1940   10 Sheets-Sheet 2
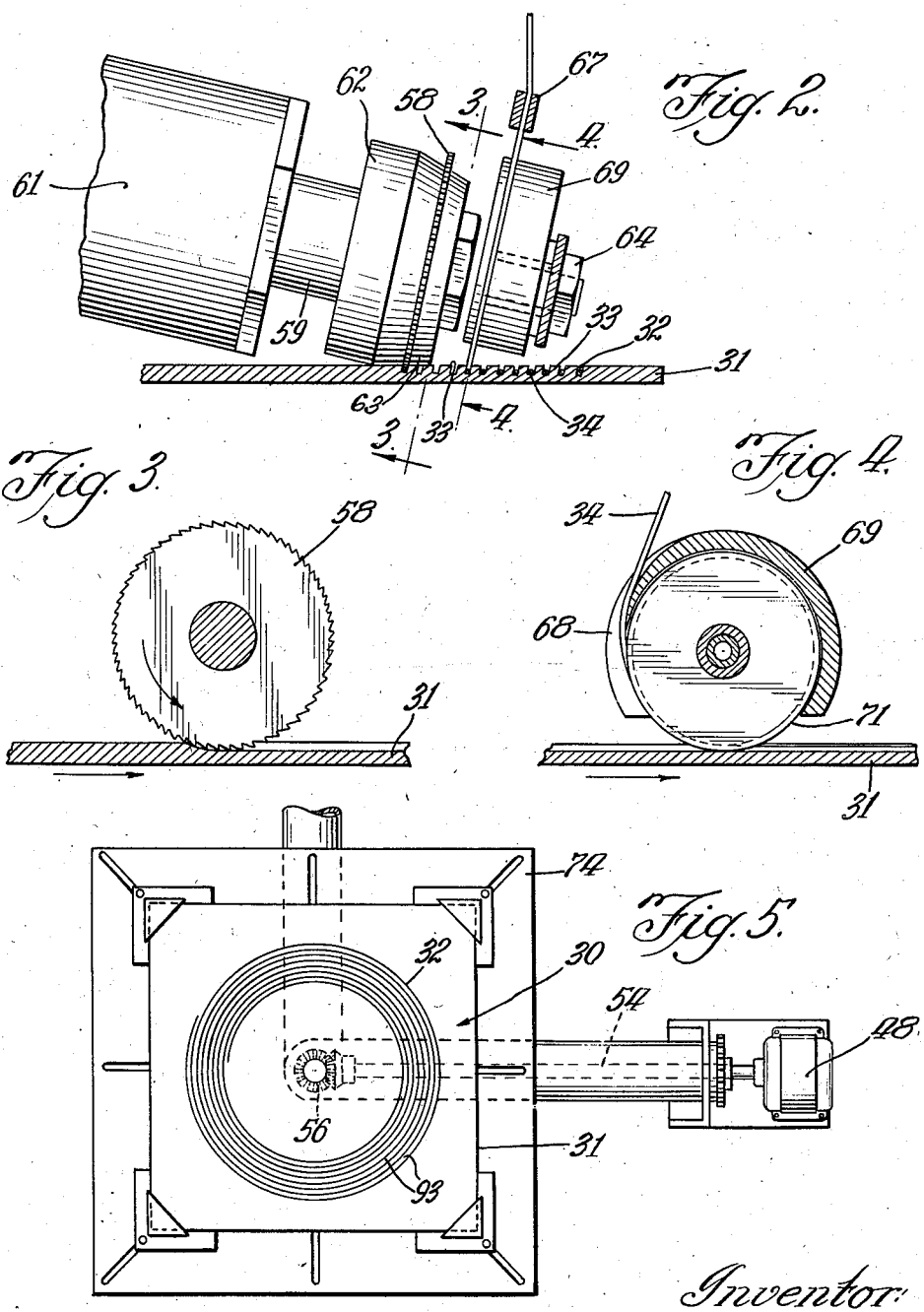

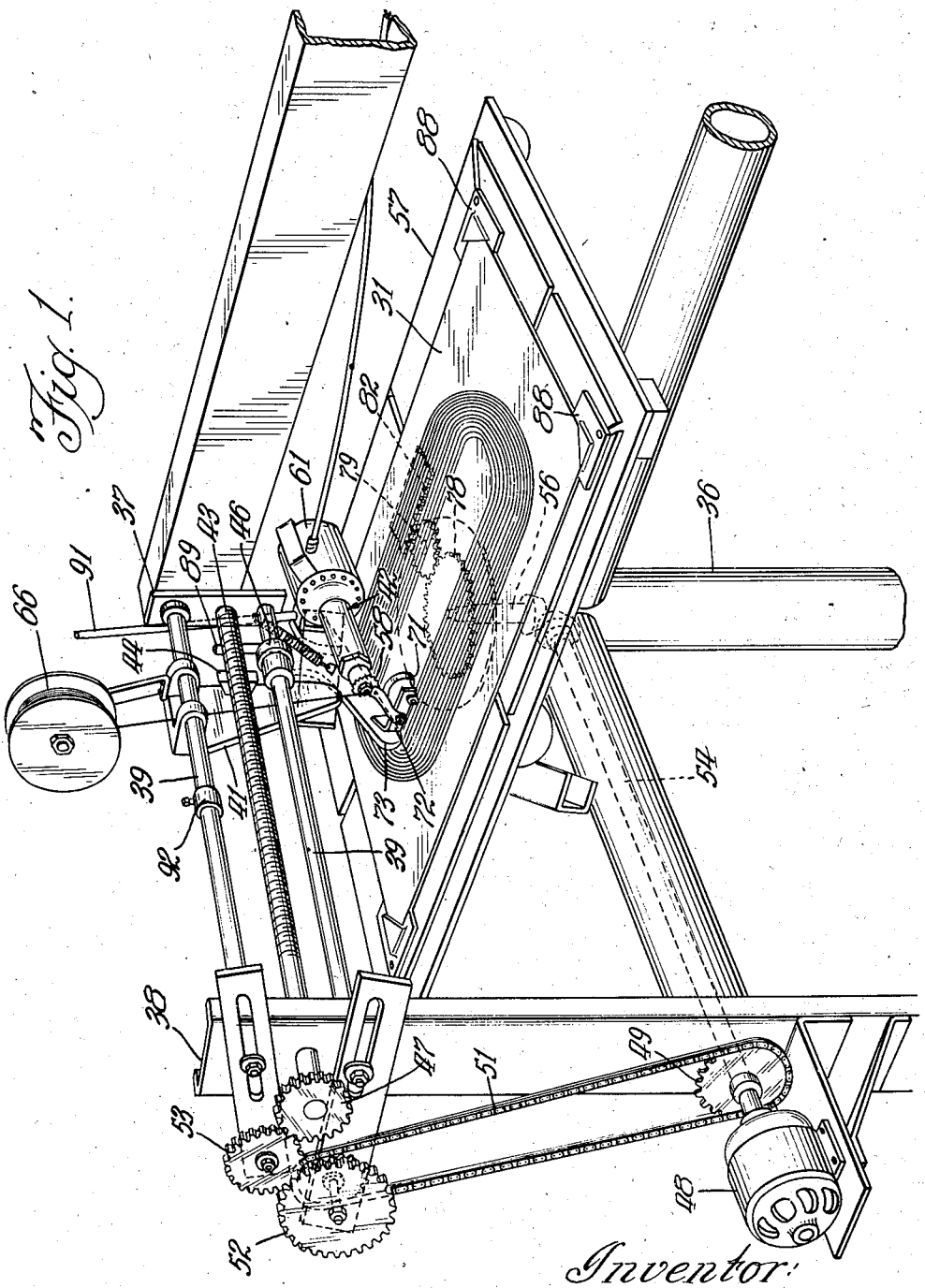

Jan. 30, 1945.                H. P. VON KNAUF                2,368,389
                APPARATUS FOR MAKING ELECTRICAL COILS
                    Filed Oct. 28, 1940        10 Sheets-Sheet 3
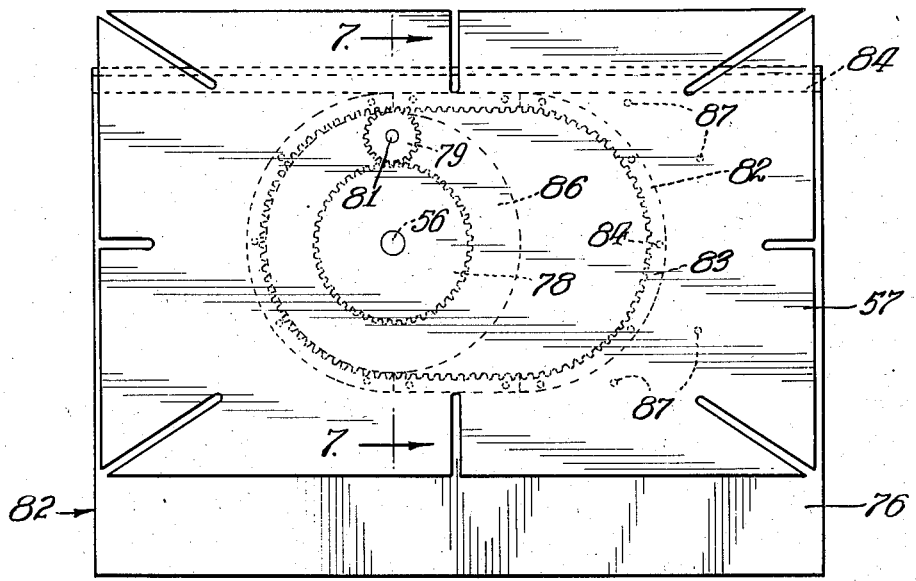
Fig. 6.
Fig. 7.
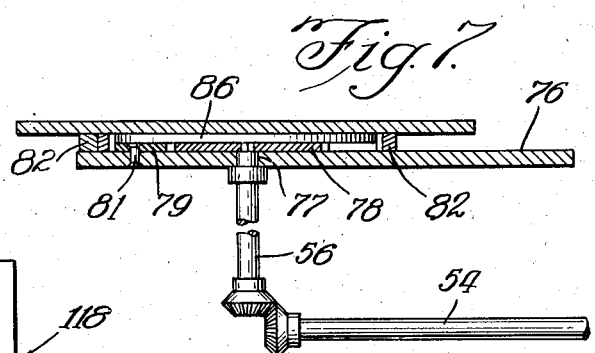
Fig. 8.
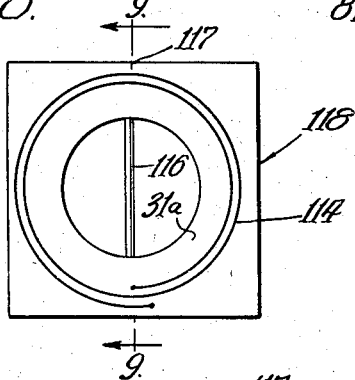
Fig. 9.
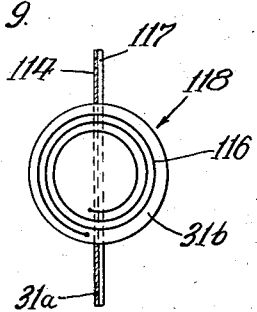
Fig. 10.
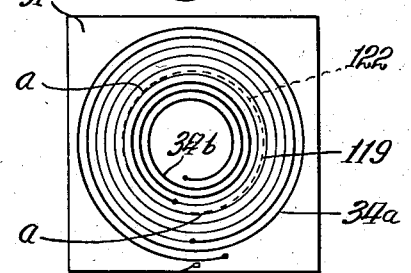
Inventor:
Harry P. Von Knauf
By Foorman L. Mueller
                Atty.

Inventor:
Harry P. Von Knauf

Jan. 30, 1945.  H. P. VON KNAUF  2,368,389
APPARATUS FOR MAKING ELECTRICAL COILS
Filed Oct. 28, 1940  10 Sheets-Sheet 5

Inventor
Harry P. Von Knauf
By Tooman L. Mueller
Atty.

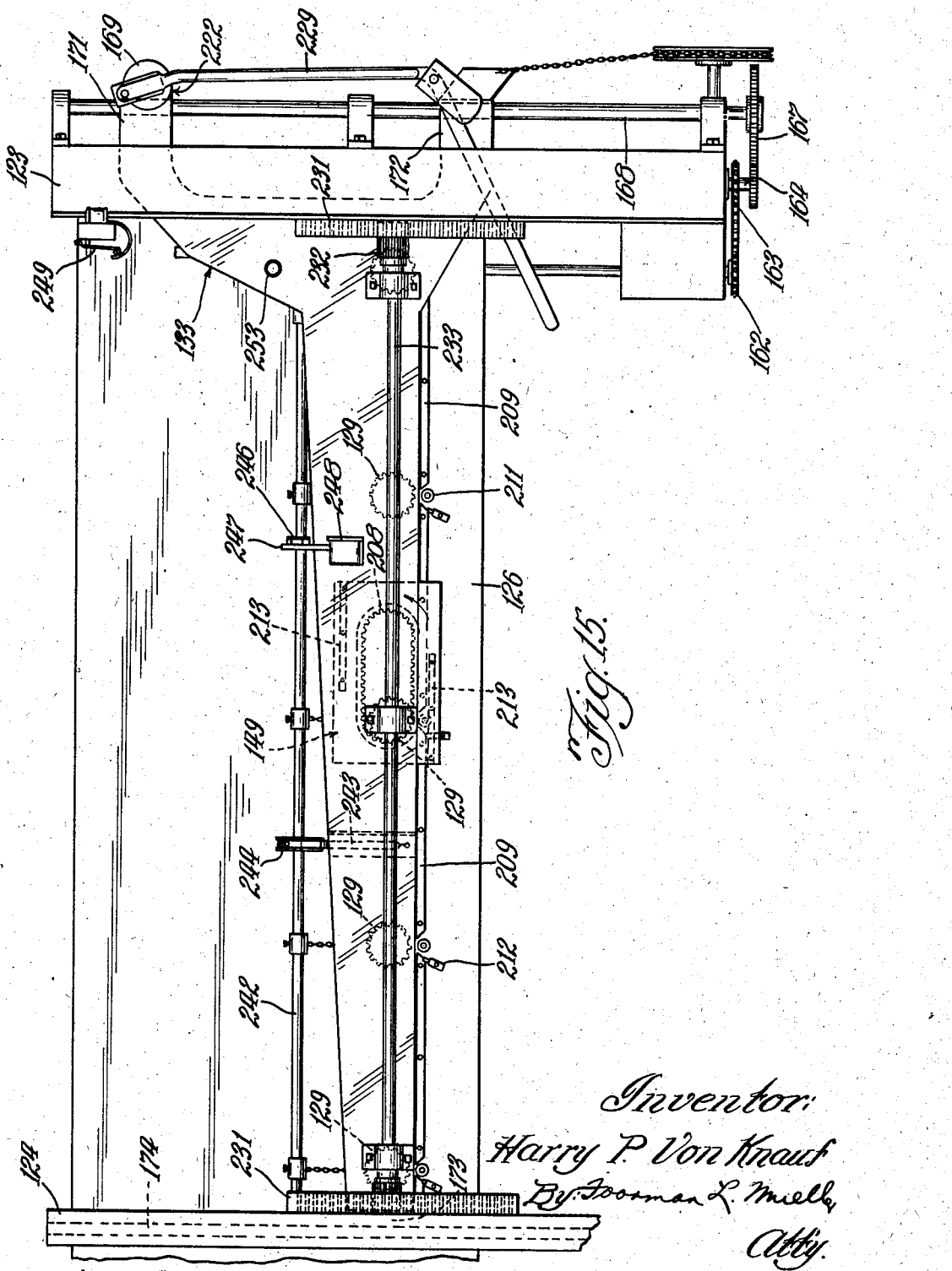

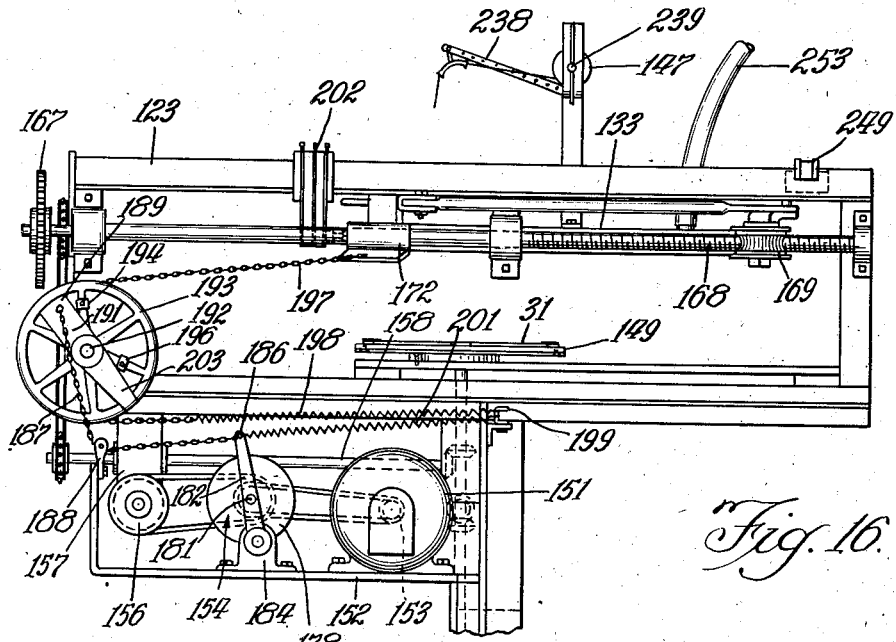
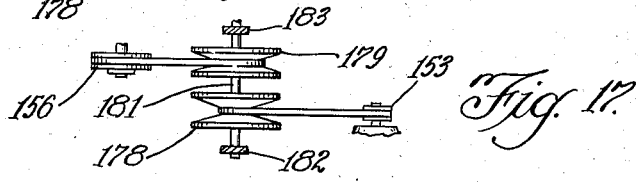
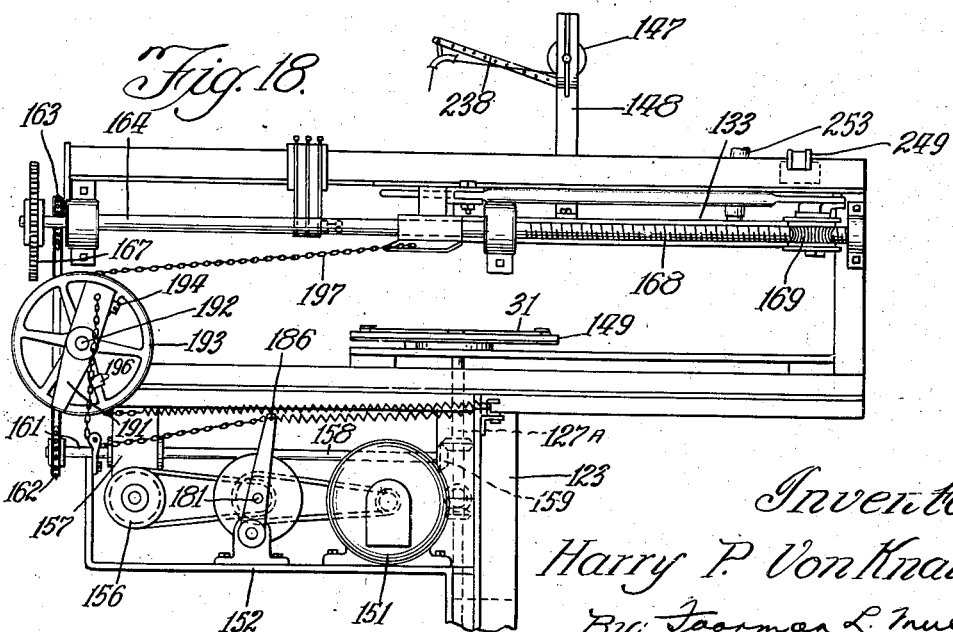

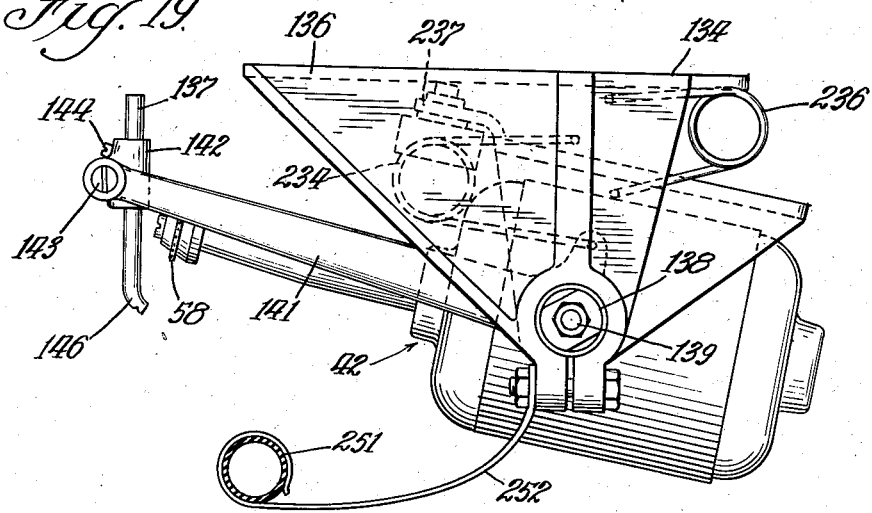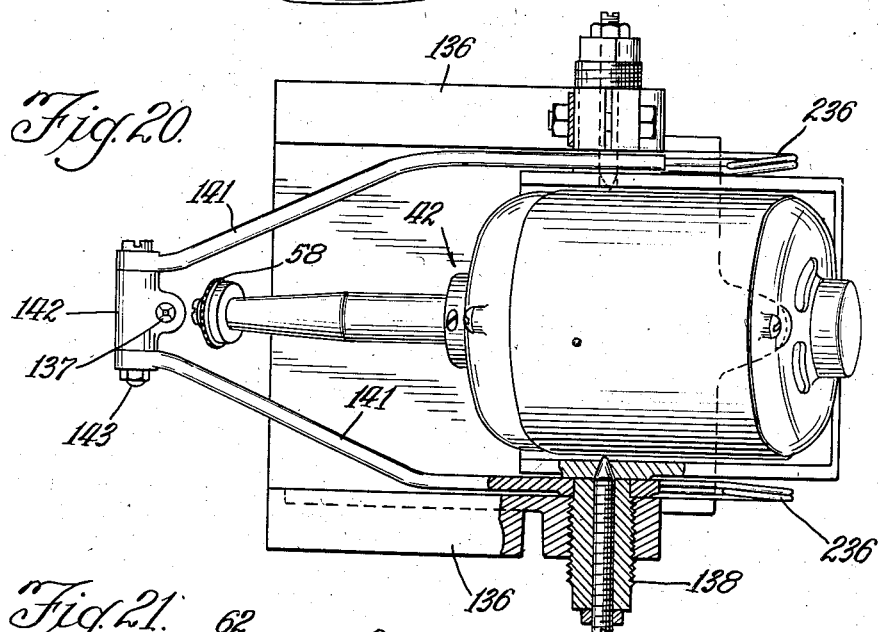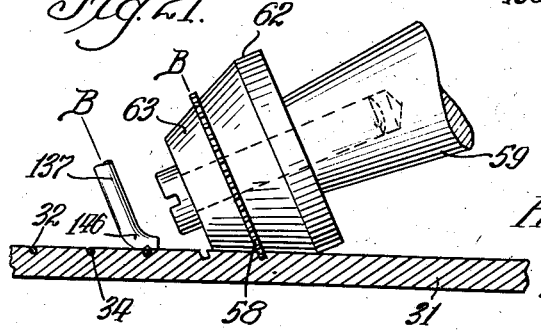

Jan. 30, 1945. H. P. VON KNAUF 2,368,389
APPARATUS FOR MAKING ELECTRICAL COILS
Filed Oct. 28, 1940 10 Sheets-Sheet 9

Inventor:
Harry P. Von Knauf
By: Toomen L. Mueller
Atty.

Jan. 30, 1945.  H. P. VON KNAUF  2,368,389
APPARATUS FOR MAKING ELECTRICAL COILS
Filed Oct. 28, 1940  10 Sheets-Sheet 10
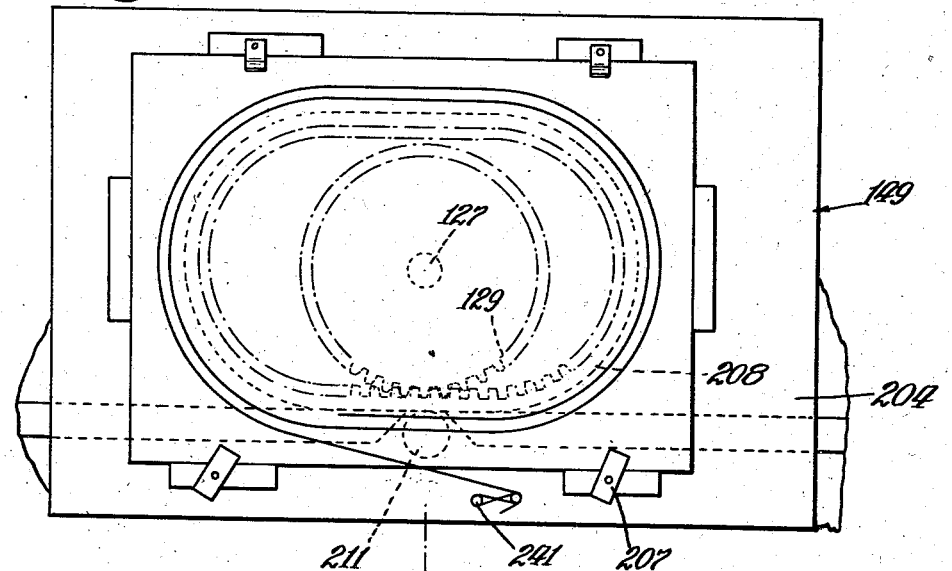
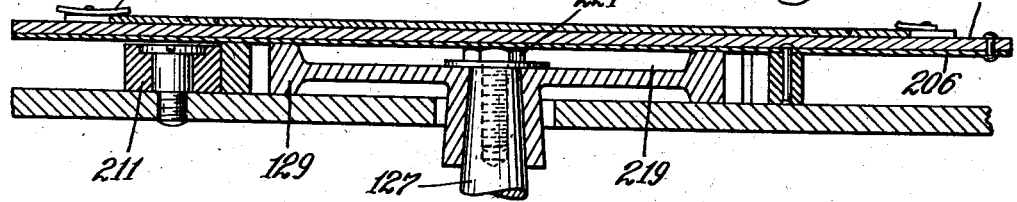
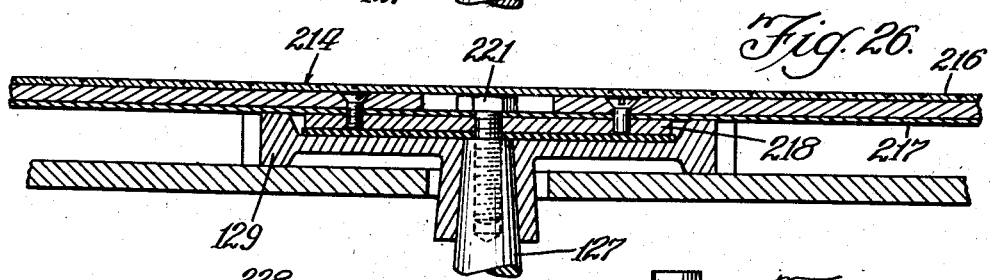
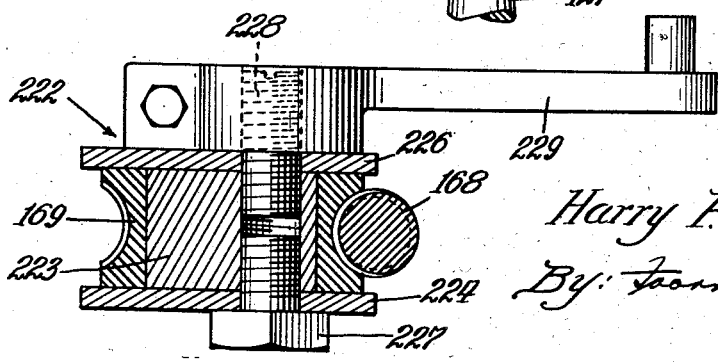
Inventor:
Harry P. Von Knauf
By: Foorman L. Mueller
Atty.

Patented Jan. 30, 1945

2,368,389

UNITED STATES PATENT OFFICE 2,368,389

APPARATUS FOR MAKING ELECTRICAL COILS

Harry P. Von Knauf, Chicago, Ill.

Application October 28, 1940, Serial No. 363,115

26 Claims. (Cl. 29—33)

This invention relates to an apparatus for making electrical coils and in particular to the method and apparatus for making loop antenna coils of flat form type for radio apparatus. This application is a continuation in part of application Serial No. 333,299, filed May 4, 1940.

Coils of flat type are particularly applicable to be assembled as an integral part of a radio set to form a compact and complete receiving unit. Prior coils of this general type, however, are rather expensive in cost so that, particularly in portable radio sets, the cost of the set is greatly increased by the initial cost of the coil. Further, since the coil is usually housed within the radio cabinet, the size or bulk of the coil directly affects the size of the cabinet and hence also the overall cost of the set. Many attempts have been made in the prior art to commercially produce flat coils which overcome these difficulties but these attempts have not been entirely satisfactory because of the generally costly assembly of the coil to its mounting plate and the bulk of the complete coil unit.

It is an object of this invention, therefore, to provide an improved apparatus for making electrical coils.

Another object of this invention is to provide an improved apparatus for commercially producing flat type coils at a low cost whereby to extend the use and application of such coils.

Yet another object of this invention is to provide an improved apparatus for manufacturing coils which is simple and rugged in construction and which may be operated by an unskilled operator to efficiently produce coils of a uniform construction in a minimum of time.

Another object of this invention is to provide apparatus for making a coil unit in which the machining operations on the coil mounting plate are performed substantially simultaneously with the assembly of the coil winding to the plate to in all reduce the manufacturing costs of the coil to a minimum.

A feature of this invention is found in the provision of apparatus for making coils which is readily adapted to produce coils of flat type in a plurality of shapes with a minimum change in the operating parts thereof.

A further feature of this invention is the provision of apparatus for making coils having a flat base member with a spiral groove formed in one side thereof for receiving a winding, in which the operations of cutting the groove and the disposition of the winding in the groove are performed substantially simultaneously.

Yet another feature of this invention is the provision of apparatus for making coils having a flat mounting plate with a spiral groove formed in a side thereof for receiving a winding, which operates to form a groove with smooth unbroken edges adapted to retain and lock the winding thereunder.

A still further feature of this invention is the provision of apparatus for cutting a spiral groove in a flat rotating member in which a groove cutter at substantially constant speed is moved across the face of the rotating member, while the rotational speed of the rotating member is automatically increased as the cutter approaches the center of the spiral, whereby to maintain substantially uniform the rate at which the groove is being cut.

Further objects, advantages and features of this invention will become apparent from the following description when taken in connection with the accompanying drawings in which:

Fig. 1 is a view in perspective showing one form of the improved apparatus for making a single coil unit at one time;

Fig. 2 is an enlarged fragmentary view partly in section showing the relative operating positions of the groove cutter and winding laying means;

Fig. 3 is a sectional view taken on line 3—3 in Fig. 2;

Fig. 4 is a sectional view taken along the line 4—4 in Fig. 2;

Fig. 5 is a plan view of a working table used in the apparatus of Fig. 1 for the making of loop coils of circular form;

Fig. 6 is a view illustrated similarly to Fig. 5 showing a working table used in the making of coils of substantially oval or elliptical form;

Fig. 7 is a sectional view taken along the line 7—7 in Fig. 6;

Fig. 8 is a front elevational view of a multi-piece coil unit made by use of the working table illustrated in Fig. 5;

Fig. 9 is a sectional view as seen along the line 9—9 in Fig. 8;

Fig. 10 is a plan view of the loops in the coil unit of Figs. 8 and 9 before their separation;

Fig. 13 is a view illustrated similarly to Fig. 12 showing the arrangement of the link system at the end of the groove cutting operation;

Figure 14:
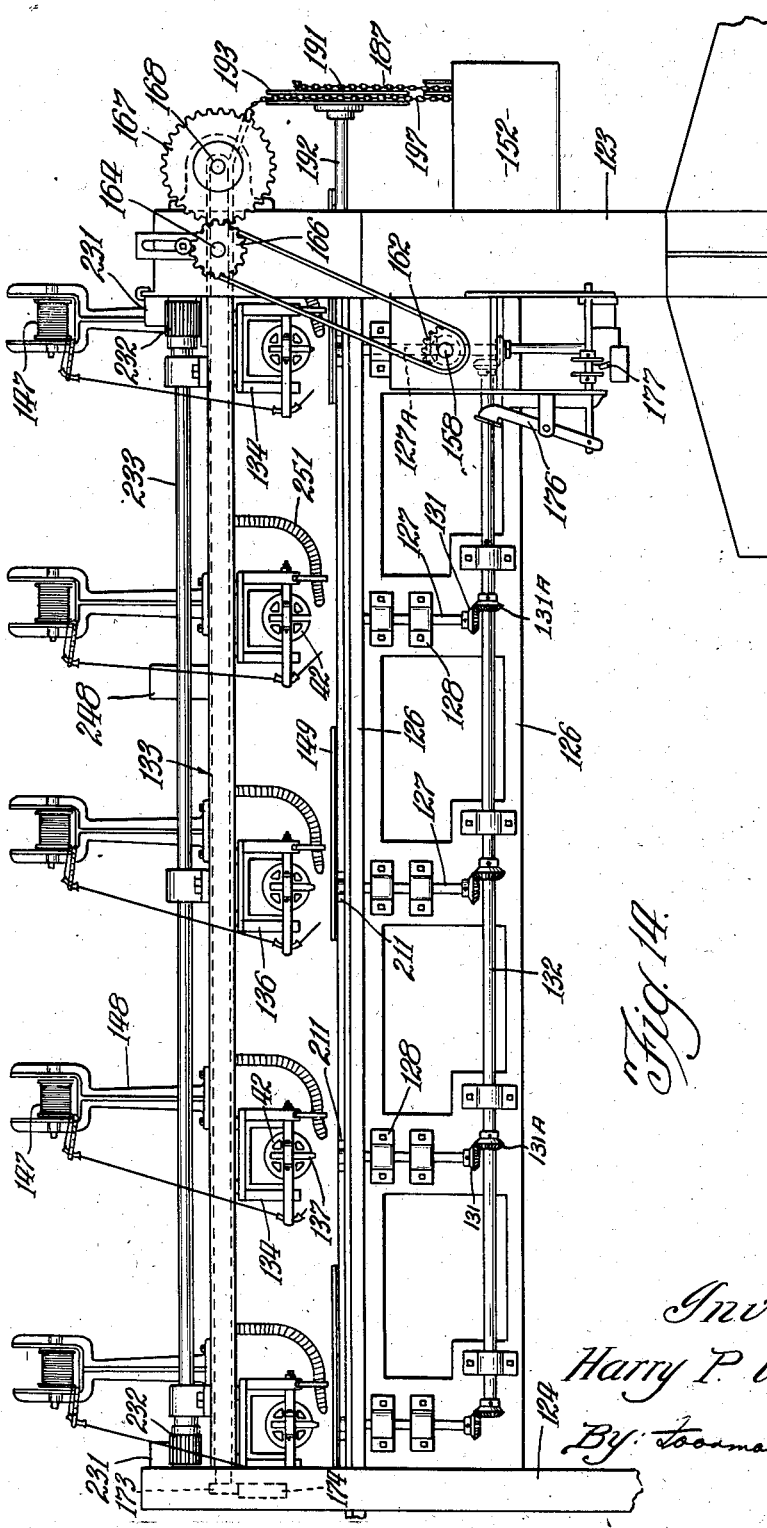
Figure 22:
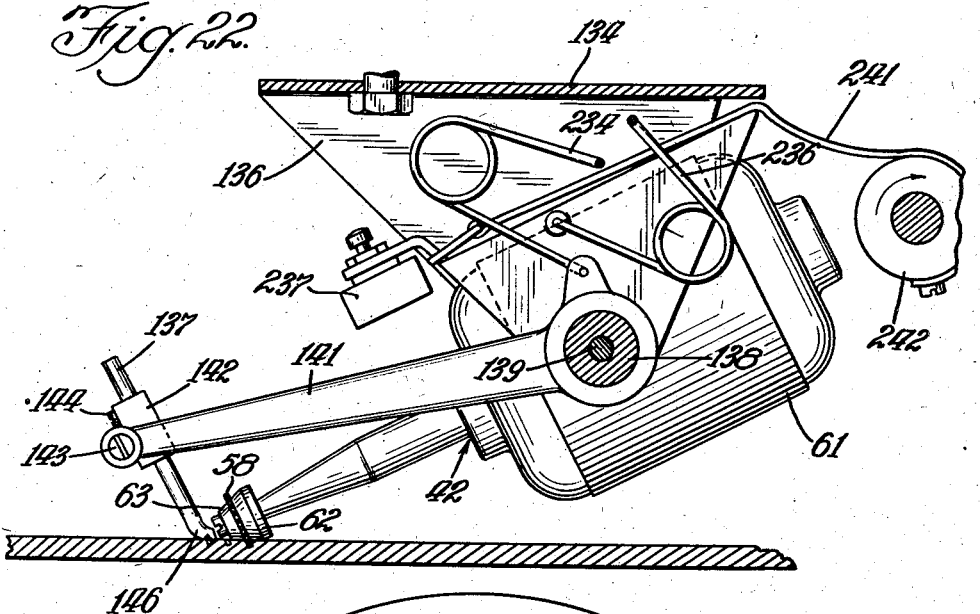
Figure 23:
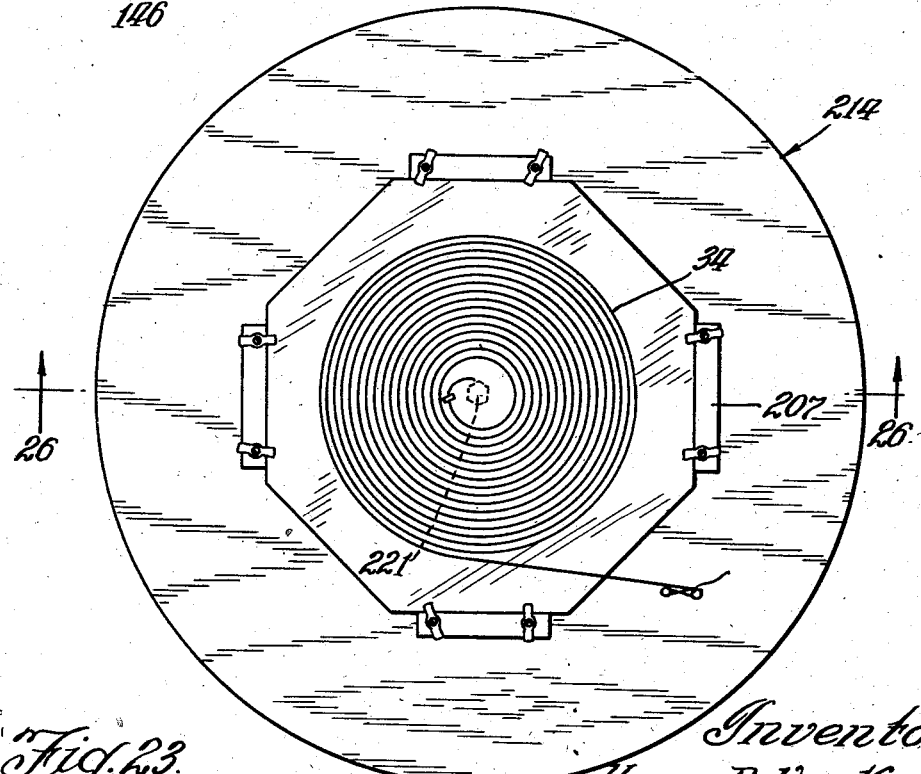

Fig. 14 is a side elevation of a modified form of the improved apparatus for producing a plurality of coil units at one time;

Fig. 15 is a plan view of the apparatus shown in Fig. 14;

Fig. 16 is a fragmentary end elevation looking toward the left as viewed in Figs. 14 and 15;

Fig. 17 is a diagrammatic illustration of a variable speed device for the working tables in the apparatus shown in Fig. 14;

Fig. 18 is a view illustrated similarly to Fig. 16 showing parts thereof in a changed position;

Fig. 19 is a side elevation of the groove cutting and wire laying means used in the apparatus of Fig. 14;

Fig. 20 is a bottom view of the groove cutting and wire laying means shown in Fig. 19;

Fig. 21 is a detailed fragmentary view partly in section showing the relative operating positions of the groove cutter and wire laying means of Fig. 19;

Fig. 22 is a view illustrated similarly to Fig. 19 showing the parts thereof in changed position;

Fig. 23 is a plan view of a working table for the apparatus of Fig. 14 which is used in the making of coils of circular form;

Fig. 24 is a plan view of a working table for the apparatus of Fig. 14 which is used in the making of coils of substantially oval or elliptical form;

Fig. 25 is a sectional view as seen along the line 25—25 of Fig. 24;

Fig. 26 is a sectional view taken along the line 26—26 in Fig. 23; and

Fig. 27 is a view partly in section showing the worm gear and screw shaft assembly used in the apparatus of Fig. 14 for driving the carriage member which supports the groove cutting and wire laying means shown in Fig. 19.

The present invention has reference to the manufacture of coil units in which the coil winding is positioned and retained within a spiral groove formed in one side of the coil mounting plate, so that overall size of the unit is no greater than the overall size of the mounting plate. One commercial form of this type of coil unit is shown in Fig. 5. The coil 30 is of substantially flat shape, the mounting plate 31 thereof having a continuous spiral groove 32 formed in one side thereof. As shown in Fig. 2 the groove 32 is inclined or slanted inwardly toward the center of the coil so that the groove edge or lip 33 extends over the bottom of the groove. Thus the wire or winding 34 when laid within the groove assumes a position below and underneath the edge 33 so as to be locked in the groove by such groove edge. In the making of this type of coil by the improved apparatus of this invention the mounting member 31 is placed in a suitable jig or supporting table and rotated while a groove cutter angularly inclined relative to the mounting member is moved across the face thereof at a uniform rate and along a radius of the coil. The coil winding, during the groove cutting operation, is laid within the formed groove by wire laying means movable with the cutter across the mounting plate and in a substantially immediate following position relative to the cutter. The groove cutting and wire laying operations are thus performed substantially concurrently so that the assembly of the coil unit is substantially complete at the time the groove is finished. The apparatus further includes adjustable means for positively defining the limits of traverse of the cutter over the mounting plate and means for raising the cutter from the plate at the completion of the cutting operation, whereby to cut the groove of a predetermined length. Since the coil winding is continuous and coextensive in length with the length of the groove the electrical characteristics of a particular run of coils are thus maintained substantially uniform.

Referring to Fig. 1 of the drawings, the apparatus is seen to include a supporting base 36 and frame members 37 and 38 having guiding rods or ways 39 secured therein. A carriage 41 including a pivotally supported cutting head 42 is slidably supported on the rods 39. Arranged between the guides 39 and rotatably mounted in the members 37 and 38, is a screw shaft 43 which is in driving engagement with the carriage 41 through threaded connection with a half nut 44 which is carried on the carriage. A collar 46 freely rotatable on the lower guide 39 serves as a support for the lower portion of the carriage 41, the carriage being pivotally movable on the upper guide 39 away from the screw shaft 43, for a purpose to be later described. A driving gear 47 mounted at one end of the screw shaft 43 is operatively associated with a driving motor 48 through gear 49, belt or chain connection 51 and reduction gears 52 and 53. A variable driving speed of the screw shaft 43 is obtained through the reduction gears 52 and 53 so as to vary the rate of movement of the carriage 41 longitudinally of the screw shaft in an obvious manner. The motor shaft 54 is extended for direct connection with a vertical drive shaft 56 which drives a work table 57 rotatably supported on the base 36. It is to be understood, however, that gears (not shown) can be interposed between the shaft 54 and motor 48 to provide a variable speed drive for the shaft 56.

The cutting head 42 includes a cutter 58 (Fig. 2) which is formed with a succession of teeth and mounted at one end of a shaft 59 for a high speed motor 61. The cutter 58 is positioned between holding or friction collars 62 and 63 having correspondingly sloped peripheral surfaces for slidably engaging or rolling on the upper surface of the base plate 31 for a purpose to be later fully explained. By virtue of the cutting head 42 being pivotally mounted on the carriage 41 the peripheral slope of the collars 62 and 63 determines the cutting angle of the cutter 58 relative to the horizontally extending base plate 31. Further since the collars 62 and 63 are in flush engagement with the upper surface of the coil supporting member 31, the depth of the groove 32 is determined by that portion of the cutter 58 which projects beyond the peripheries of the collars 62 and 63. The collars are locked in frictional engagement with the cutter 58 by a lock nut 64 which is threadably secured to the end of the motor shaft 59.

With the cutter 58 thus arranged to cut a slanting groove in the base plate 31, the coil wire or winding 34 embedded in the groove 32 is positioned in the groove at a similar angle to prevent any injury or damage to the groove edges which, as previously explained, serve to lock the winding within the groove. As illustrated in Fig. 1, the wire 34 is fed from a spool 66 which is rotatably mounted at the upper end of the carriage 41. The wire 34, from the spool 66, is passed through a guide 67 (Figs. 1, 2 and 4) into a guiding groove 68 formed in a housing member 69 for a roller or disc 71 having a groove for retaining the wire formed in the peripheral surface thereof. The member 69 and disc 71 are carried by a bracket 72 which is secured to an arm 73 pivotally connected at one end to the carriage 41. The disc 71 is of a thickness somewhat less than that of the cutter 58 so as to clear the edges of the groove 32 during its travel therethrough, the bracket 72 being arranged to position the disc parallel relative to the cutter 58 when the cutter 58 is in an operating position. That is, the axes of the cutter 58 and disc 71 are in alignment when the machine is in operation.

In the making of a coil, such as the coil 30 having a groove of circular spiral shape, the machine is provided with the plate supporting or working table 74 shown in Fig. 5. The table 74 is rotatably supported on the base 36 with its center in substantial alignment with the axis of the shaft 56. On operation of the motor 48 the table 74 is rotated concurrently with the moving of the cutter 58 across the plate 31, the combined effects of these two movements providing for the formation of a circular spiral groove in the plate 31.

When an elliptical or oval loop is being made, the jig or table structure 57 shown in Figs. 6 and 7, is substituted for the plate supporting table 74. The bed plate 76 for the structure 57 is secured to the supporting base 36 and is formed with a bearing 77 for receiving the vertical shaft 56. A gear 78 mounted on the end of the shaft 56 is in meshing engagement with a gear 79 which is rotatably supported on a stub shaft or pin 81 mounted in the bed plate 76. The gear 79 is in meshing engagement with a continuous rack 82 of substantially oval shape, which is formed of a plurality of segments 83 attached to the lower side of the supporting table 57 by means of screws 84. Driving of the gear 79, therefore, by the gear 78 moves the rack 82 about the gear 79, the rack and gear 79 being maintained in meshing engagement by a disc 86 arranged between the bottom of the working table 57 and the top side of the gears 78 and 79. The disc 86 is of a diameter which is substantially equal to the minor axis of the oval rack 82. By virtue of the sliding engagement between the edge of the disc and the rack 82 a swinging or pivotal movement of the rack about the gear 79 is substantially eliminated. The elliptical movement of the table 57 thus corresponds to the elliptical shape of the rack 82. On rotation of the shaft 56, therefore, gears 78 and 79 and rack 82 coact to elliptically rotate the table 57. Since the cutter 58 is moved transversely of the table 57 by the screw shaft 43, as will be explained, an elliptical spiral groove is formed in the plate 31. A change in the size of the oval or elliptical coil is readily obtained by increasing or decreasing the length of the straight side portion of the rack 82, the table 57 being formed with suitable threaded apertures 87 for the screws 84 to provide for any desired change in the length of these portions. Since the cutter head 42 and the disc 71 are used for the making of both the circular and elliptical coils, the machine provides for the making of a plurality of coils of varying contours and sizes by simply interchanging the jig or table structures 57 and 74.

The operation of the machine is best understood from Figs. 1 through 4, and will be described with reference to the elliptical loop shown in Fig. 1, although it is to be understood that the operation is the same for either circular or elliptical coils. In the setting of the apparatus the carriage 41 is pivotally moved about the upper way 39 in a clockwise direction, as viewed in Fig. 1, and/or away from the screw shaft 43, this pivotal movement disengaging the half nut 44 from the shaft 43 and positioning the cutter head 42 and roller assembly 71 entirely clear of the table 57. The base member 31 is then secured in place on the table by suitable holders 88 arranged at each corner of the plate 31. On swinging of the carriage back to its normal operating position in engagement with the screw shaft 43 the cutter 58 and disc 71 are pivotally moved upward out of engagement with the plate 31 by manipulation of levers 89 and 91, respectively. With the coil of a predetermined size the cutter 58 is positioned on the plate 31 outwardly from the major axis of the loop a distance substantially equal to one-half the length of the minor diameter or axis of the coil. This position of the cutter may be defined by a suitable stop member, such as 92 mounted on the guide rod 39. The thickness of the cutter 58 is determined by the gauge of the coil winding 34 and is contemplated to be substantially equal in width to the diameter of such wire to provide for the wire being firmly imbedded in the groove 32 to be formed. In one application of the invention the cutter 58, and hence also the wire feeding disc 71, which is arranged parallel to the cutter 58, are positioned at an angle of about 28 degrees from the vertical, the friction collars 62 and 63 being of a size such that the groove depth is about three times the radius of the wire 34. In this instance it is contemplated that the base plate 31 have a thickness substantially equal to twice the diameter of the winding 34. A desired spacing between the adjacent groove portions is obtained by a proper selection of the gears 49, 52 and 53, relative to the gear 47, which gears control the speed of rotation of the screw shaft 43.

On starting of the motor 48 for the table 57 and carriage 58, the cutter head 42 is moved axially of the screw shaft 43 in a direction toward the center of the supporting plate 31. In the making of elliptical coils this movement of the cutter head 42 is such as to move the cutter 58 in an axial direction relative to the motor shaft 59, the axis of which in the initial setting of the cutter is arranged in the vertical plane of one of the axes of the elliptical rack 82. In the making of a circular coil the axis of the motor shaft 59 is initially arranged to extend through the center of the plate 31. After the machine has operated to cut a groove comprised of several loops the motor 48 is stopped and the wire feeding disc 71 is moved pivotally downward into the first formed loop. It is to be understood, of course, that the cutter 58 and disc 71 when in their relative operating positions, are spaced a predetermined distance apart, which is in correspondence with the desired spacing of the groove loops. Thus on a restarting of the motor 48 the groove is cut concurrently with a laying of the wire therein. As will be later explained, the improved apparatus can be modified to perform these two operations substantially concurrently on an initial starting of the motor 48. This operation of the machine continues until the groove 32 has been extended to a desired length, at which time the cutter 58 is moved out of engagement with the plate 31 by the handle 91 and the wire feeding disc 71 is maintained in operation until the wire has been laid in the groove over its entire length. The coil is thus completely assembled and the machine is arranged for the making of a second coil by pivotally swinging the carriage 39 out of engagement with the screw shaft 44 and moving it back to its starting position along the upper guide 39 as defined by the stop 92.

The wire 34, as previously mentioned, is retained in the groove 32 by the locking action of the groove edge or lip portion 33. This lip is formed by the inclination of the cutter 58 inwardly toward the center of the coil mounting plate 31. In this way the bottom portion of the groove is positioned closer to the center of the coil than its corresponding upper portion. The wire 34 in its position in the groove is thus also positioned closer to the center of the loop than the upper portion of the groove and is out of vertical alignment with such upper portion. By virtue of this groove construction the wire is firmly positioned in the base plate 31 and can only be removed from the groove by a complete breaking or tearing away of the lip portion 33.

In the cutting of a spiral groove, particularly in a base plate formed of a shreddable material such as cardboard, composition board or the like, considerable trouble was encountered in the prior art machines by the undercutting or tearing of the groove edge 33 and ribbon portions 93 (Fig. 5) between adjacent groove loops. This difficulty is entirely eliminated in the present invention so that the groove 32 is formed with sound and unbroken edges and with substantially solid or rigid portions 93 between the adjacent groove portions. This is accomplished, as shown in Fig. 3, by rotating the cutter 58 in a direction to cut downwardly into the plate member 31 so that the biting action of the teeth in the material is downwardly toward the supported body portion of the plate member 31 rather than upwardly toward the unsupported upper surface of the plate 31. In other words, and as is clearly indicated by the arrows in Fig. 3, the cutter 58 is rotated in a direction to cut with the direction of movement of the member 31 at the zone of cutting engagement. To further assure an accurate forming of the groove 32 the friction collars or rollers 62 and 63 are in supporting engagement with the edges of the groove at the zone adjacent the cutter 58, to hold the edges from being moved upwardly by the cutter. Since the rate of groove cutting is dependent upon the material forming the plate 31, the relative speeds of the cutter 58 and mounting plate 31 are such that the plate will not be burned or otherwise injured at the groove 32.

Figure 11:
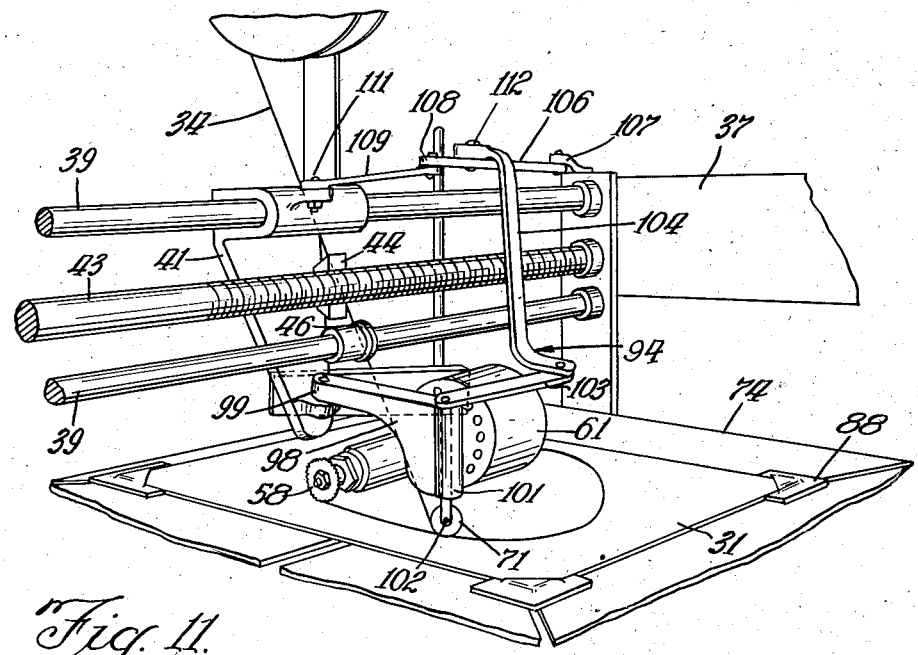
Fig. 11 is a perspective view showing a modified form of wire laying means.
Figure 12:
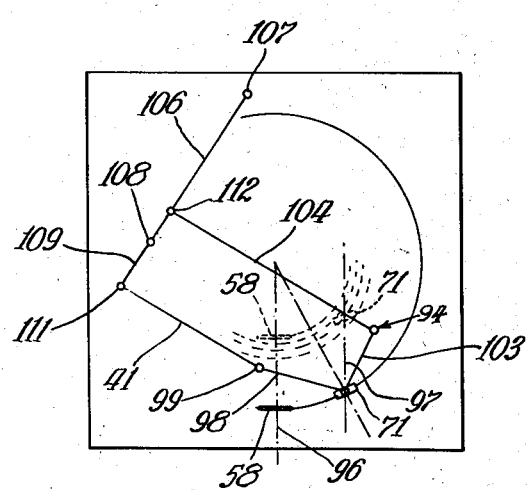
Fig. 12 is a somewhat diagrammatic illustration showing the link system of the wire laying means of Fig. 11 at the start of the groove cutting operation.
Figure 13:
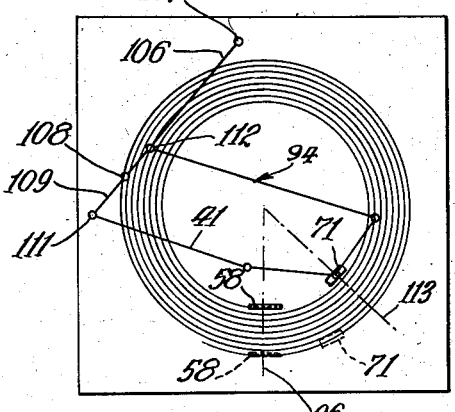

As was previously mentioned, the improved apparatus of Figs. 1 to 7, may be adapted on an initial starting of the motor 48 to cut the groove 32 substantially concurrently with a laying of the wire 34 therein. In the making of a circular spiral coil as above fully described, the cutter 58 is arranged to move on a center line or radius of the coil in a direction which is parallel to the movement of the carriage 41. By virtue of this arrangement, the plane of the cutter 58 is always substantially in a plane tangent to the groove being cut at the junction of the groove with the above-noted radius line. Since the wire feeder or guiding disc 71 is spaced a distance of about two grooves behind the cutter 58, and arranged in a plane parallel to the plane of the cutter 58, the disc 71 is also in a plane tangent to the groove at such radius line. Where the disc 71 is in an immediate following relation with respect to the cutter 58, as illustrated in Figs. 12 and 13, it is angularly displaced to one side of the radius or center line indicated as 96, so that during the movement of the carriage 41 across the plate 31 the disc 71 crosses the spaces 93 between the groove portions at an angle such that the distance which it covers in crossing a space is greater than that which is covered by the cutter 58. Also with the disc 71 positioned tangent to the radius line 97, angularly disposed from the center line 96, it is readily apparent that as the disc approaches the center of the coil it tends to position itself transversely of the groove rather than within the groove as indicated by its dotted-line position shown in Fig. 12. This positioning of the disc is due to its movement on a line parallel with the center line 96 and to the fact that the groove spiral becomes progressively smaller towards the center of the coil. Thus with the disc 71 substantially immediately following the cutter 58, its motion toward the center of the coil must be directed so that it is retained in the groove for all operating positions thereof. This is accomplished by a link system or mechanism 94 for the disc 71, illustrated in Figs. 11, 12 and 13 and which will now be explained.

The link mechanism 94 includes a supporting member 98 for the disc 71 having one end pivotally connected at 99 to the carriage 41. The opposite end of the member 98 is formed with a bearing portion for rotatably supporting the disc shaft 101 which has a pin 102 extending transversely therethrough near its lower end for rotatably supporting the roller disc 71. A lever 103 is fixedly secured at one end to the upper end of the shaft 101, its opposite end being pivotally connected to an upwardly extending arm 104, the upper end of which is pivotally connected to a lever 106 intermediate its ends 107 and 108. End 107 of the lever 106 is pivotally connected to a portion of the frame structure 37, while end 108 is pivotally connected to one end of a link 109, the opposite end of which is pivotally connected to the carriage 41 at 111, which pivot point is in vertical alignment with the pivotal connection 99. Adjustment of the mechanism 94 for a particular loop size is made at pivotal connections 111 and 112, the link 109 being slidably movable relative to the pivot 111 and the lever 104 being slidably movable relative to the arm 106 to shift the position of the pivotal connection 112 thereon.

In the adjustment of the link mechanism 94 a groove 32 of a desired size and length is first completely cut in a mounting plate 31. With this plate in position on the supporting table 74 the disc 71 is placed in its initial starting position by suitable adjustment of the pivot connections 111 and 112. The carriage 41 is then moved to a position such that the cutter 58 is substantially at the end of the groove cut. Since the disc 71 is movable with the cutter 58 its position at this end position of the cutter is checked so as to assure its proper travel over the entire traverse of the plate 31. The starting and end positions of the disc 71 relative to the groove 32 are thus utilized in obtaining a correct setting of the link mechanism. At the completion of this setting the disc 71 is ready for operation.

A coil mounting plate 31 is positioned on the supporting table 74 as was hereinabove described and the carriage 41 is moved to its starting position against the stop 92. As shown in Fig. 12, which illustrates the starting positions of the cutter 58 and disc 71, the cutter is arranged so that its plane is substantially normal to the coil center line 96. The cutter in this position is operated while the table 74 is rotated only sufficiently to provide for a groove having a length equal to a predetermined spaced distance between the centers of the cutter 58 and disc 71. In practice it is contemplated that this distance be about four inches, the diameters of the cutter 58 and disc 71 being about three-quarters of an inch. The disc is then positioned in the groove 32 with its plane substantially tangent to the radius line 97. With the cutter 58 and disc 71 thus relatively arranged, the machine is set into operation, which operation is continued until the groove 32 is cut to the desired length. As shown in Fig. 13 the disc 71, by virtue of the link mechanism 94, is progressively moved into a more lagging position relative to the cutter 58 and retained in the groove 32 for the entire length thereof. Thus on completion of the cutting of the groove 32, the disc 71 is in the position shown in Fig. 13, and normal to the radius line 113, which is angularly displaced from the initial radius line 96 by the amount indicated therebetween. The link mechanism 94 thus operates to move the disc 71 in a manner to continuously follow the contour of the groove 32 in a substantially immediate following position relative to the cutter 58 to provide for the laying of the wire in the groove substantially concurrently with the starting of operation of the cutter.

The apparatus in Figs. 1 to 7 has been described above in connection with the making of coils of unitary structure, namely, a coil having a single coil winding mounted in a supporting plate of substantially flat form. In some instances of radio operation, however, a coil of more than one winding or loop is desirable to effect particular operating characteristics. One commercial embodiment of a multi-loop coil is illustrated in Figs. 8 and 9, the loops 114 and 116 being mounted at right angles with respect to each other on a common mounting bar 117. The loops are electrically related to provide for a non-directional quality of the coil by an electrical connecting thereof rather than by mechanical means for rotating the complete coil unit 118. A coil unit of this kind can thus be assembled in a fixed or stationary position within the radio cabinet so as to completely eliminate the space usually required for a mechanically rotatable coil unit. To obtain a substantially flat signal response in all directions for the coil unit 118, it is contemplated that the signal induced in the large loop 114 be substantially equivalent to that received by the small loop 116. Since the magnitude of the induced signal varies directly with the diameter and number of turns in each of the loops 114 and 116, this flat signal gain is accomplished by having a greater number of turns in the smaller loop than in the larger loop. With the electrical characteristics of the coil windings of a known value, the number of turns required in each of the loops 114 and 116 are readily determined, it being understood, of course, that the number of turns are based upon the predetermined size of the diameter of the large loop 114. As illustrated, the loops 114 and 116 are of circular form. However, the loops may also be made of elliptical shape as will be apparent from the following operating description of the improved apparatus when making the coil unit 118.

The assembly of the apparatus is similar in all respects to that shown in Fig. 1, with the cutter head 42 and guiding disc 71 pivotally supported on the carriage 41. In the setting up of the apparatus the plate 31 (Fig. 10) is supported on the table 74 (Fig. 5) and the apparatus is set into operation as was previously fully described in connection with the elliptical coil shown in Fig. 1. However, the number of turns of the winding 34A necessary to make the large loop 116 of a predetermined size are counted by the operator and the apparatus is stopped. Wire 34 is then cut and the disc 71 pivotally raised out of engagement with the plate 31 and the apparatus restarted with only the cutter 58 in operation. When the spacing between the loops 114 and 116 is such that the outer turn of the small loop 116 is of the proper diameter, that is in correspondence with the size of the loop 114, the apparatus is again stopped and the disc 71 pivoted downwardly into its operating position relative to the cutter 58 and plate 31. Thus on a restarting of the machine the cutting of the groove and the laying of the wire again proceed concurrently. When the loop 116 is of the correct number of turns the cutter 58 is pivotally raised out of cutting engagement with the plate 31 and the disc 71 is continued in operation until the winding 34B extends substantially to the end of the groove cut.

As is clearly indicated in Fig. 10, the mounting plate 31 after the above described operations, is seen to be formed with a continuous groove 32, having winding lengths 34A and 34B arranged in portions thereof and corresponding to the desired sizes and electrical characteristics of the loops 114 and 116, respectively. The extent of the winding lengths 34A and 34B and groove length 119 therebetween, is readily obtained by the operator counting the turns made by the table 74 during the operation of the apparatus. This is simply accomplished by positioning a suitable marker as indicated at 121 in Fig. 10, near the edge of the mounting plate 31 so as to be plainly visible to the operator.

Plate 31, on its removal from the table 74, is cut along the circular marking 122 indicated in dotted lines in Fig. 10, to form the separate loops 114 and 116 having mounting plates 31A and 31B, respectively. This cutting may be done by placing the plate 31 in a machine (not shown), in which a suitable cutter is positioned somewhat similarly to the cutter 58 in Fig. 1 and arranged to cut entirely through the plate 31. A separation of the windings 34A and 34B may also be formed by cutting the mounting plate 31 with a cutting knife or like means (not shown) along that portion of the circular marking 122 indicated between the lines a—a, the groove 32 in the plate being of sufficient depth so that the loop 114 may be broken out from the mounting plate 31. The loops 114 and 116 are mounted on the common mounting bar or support 117 at right angles to each other, with the smaller loop 116 extending through the larger loop 114 and the loops being in diametrical alignment. Although the coil 118 has been described with specific reference to the forming of two loops 114 and 116 it is to be understood that any desired number of loops may be formed from a single mounting plate 31 in a manner similar to that above described.

Referring to Figs. 14 through 27, there is shown a modified form of the improved apparatus which is adapted to make a plurality of similarly constructed coils at one time. As shown in Figs. 14 and 15, the machine is seen to include frame standards 123 and 124 with a stationary table or bed 126 supported therebetween. Vertically arranged driven shafts 127 and a driving shaft 127A are equally spaced longitudinally of the table 126, each shaft 127 being rotatably supported in a pair of bearings 128 which are mounted on depending portions of the table 126. The upper end of each shaft 127 and 127A extends through the top of the table 126 for the mounting thereon of a driving gear 129 to be explained. A beveled pinion gear 131 is mounted at the lower end of each shaft 127 in meshing engagement with a corresponding gear 131A mounted on a longitudinally extending power shaft 132, rotatably supported on the table 126. Shaft 132 is common to all of the shafts 127 and is driven from the shaft 127A.

Vertically spaced above the table 126 is a carriage structure 133 movably supported on the frame standards 123 and 124 for movement laterally of the table 126 and including substantially U-shaped brackets 134 which are mounted on the lower side thereof. The brackets 134 correspond in number with the shafts 127 and 127A, each bracket being similarly arranged with the axis of its corresponding shaft passing substantially intermediate its leg portions 136. Each bracket 134 serves as a mounting member for the cutter assembly 42 and a wire guiding element 137 of rod-like or cylindrical shape. Since each bracket and its associated structure are similarly constructed only one thereof will be referred to in the following description.

As shown in Figs. 19, 20 and 22, each leg member 136 of a bracket 134 is provided with a bushing member 138 which extends partially within the bracket 134. Pivot pins 139 threadably secured in the bushings 138 pivotally support the cutter assembly 42 between the bracket legs, mounting arms 141 for the guiding element 137 being pivotally supported on the inwardly extending end portion of the bushings 138. Thus although the assembly head 42 and element 137 are both pivotally supported on the bushings 138, each is pivotally movable independently of the other. By virtue of the relative arrangement of each bracket member 134 with respect to its corresponding vertical shaft and the arrangement of the cutter 58 and element 137 intermediate the bracket legs 136, it is readily apparent that the axes of the cutter shaft 59, element 137 and axis of a corresponding shaft lie in the same plane. Thus on movement of the carriage structure 133 transversely of the table 126, each cutter 58 and element 137 remain in such plane for all operating positions of the carriage member.

The free ends of the mounting arms 141 have arranged therebetween a holder 142 for the guiding element 137. The holder 142 is rotatably adjustable between the arms 141 and is frictionally locked therebetween by an adjusting screw 143. On release of the screw 143, therefore, the holder 142 is adjustable to vary the position of the element 137 relative to the cutter 58. Vertical adjustment of the element 137 is accomplished by a friction screw 144 supported in the holder 142. As previously mentioned in connection with Fig. 2, the diameter of the collars 62 and 63, positioned on opposite sides of the cutter 58, determines the depth of the groove 32 formed in the supporting plate 31. Since the width of the groove and the spacing between adjacent groove loop portions are determined by a particular size coil, it is apparent that the distance between the cutter 58 and the wire guiding element 137, and indicated as B—B in Fig. 21, varies with the coil size. With the angular inclination of the cutter 58 toward the center of the coil set by the peripheral slope of the collars 62 and 63, the adjustment of the element 137 to an operating position relative to the cutter is accomplished by the adjusting screws 143 and 144, the guiding end 146 of the element 137 being positioned as close as possible to the cutter but sufficiently removed therefrom to permit of a free pivotal movement of the element 137 away from the plate 31 independently of the cutter. As is clearly shown in Figs. 21 and 22, the guiding end 146 is flat and formed with a small notch for guiding the winding 34 into the groove 32. The element 137 thus only slidably engages the plate 31 so that the winding 34 is placed in the groove 32 flush with the top surface of the plate 31. The winding spool 147 (Fig. 14) is rotatably supported on a bracket 148 mounted on the carriage structure 133 above its associated guiding element 137.

The carriage 133 and rotating table 149 connected to each gear 129 are operated by a common motor 151 which is mounted on a supporting platform 152 suitably secured to the frame standard 123 (Figs. 14, 16 and 18). Driving connection from the motor 151 to the power shaft 132 for the vertical drives 127 driving the tables 149 is accomplished through the motor pulley 153, variable speed pulley assembly 154, pulley 156, gear or transmission box 157, and shaft 158, the end 159 of which is in driving engagement with the vertical shaft 127A. The opposite end 161 of the shaft 158 is provided with a gear sprocket 162 which is in chain engagement with a second sprocket 163 mounted on a shaft 164 supported in the frame standard 123 (Fig. 15). A gear 166 also mounted on the shaft 164 is in meshing engagement with a gear 167 mounted on a screw shaft 168, which is in meshing engagement with a worm gear 169 mounted on an extending portion 171 of the carriage 133. The extension 171 and a second extension 172 slidably support one end of the carriage 133 on the screw shaft 168, its opposite end being provided with a roller bearing 173 which is in rolling engagement with a way member 174 mounted on the standard member 124. The motor 151 is thus seen to be common to the shaft 132 and carriage 133, the operation of these parts being manually controlled by a lever 176 for a clutch mechanism 177 which is operatively associated with the transmission box 157.

In the cutting of the spiral groove 32 with the cut progressing from the circumference toward the center of the plate 31, as was fully explained above in connection with Figs. 1 through 7, the rate at which the groove is cut decreases as the cutter approaches the center of the plate, due to the decreasing size of the groove loops. The rate at which the plate material can be cut to prevent any possible injury to the groove edges is determined by the plate speed at the outer groove loop. This, of course, assumes the speed of the cutter 58 as being constant. With the decrease in loop size toward the center of the plate the cutting speed near the center is thus reduced below the predetermined safe cutting speed for the plate so that the end portion of the groove is cut at a slower speed than is necesssary. The time for the groove cutting operation is, therefore, unnecessarily increased. Where coils are manufactured on a high production basis this increase in time for the groove cutting operation assumes appreciable proportions and correspondingly increases the manufacturing costs of the coils. This loss of time is eliminated in this invention by automatically increasing the rotational speed of the plate supporting tables 149 as the cutter 58 proceeds toward the center of the plate or mounting member 31.

Referring to Figs. 16, 17 and 18, the variable speed pulley assembly 154 is seen to include pulleys 178 and 179 mounted on a common shaft 181 which is rotatably supported in rocker arms 182 and 183. The arms 182 and 183 are pivotally supported at their lower ends in a mounting bracket 184 which is positioned on the frame member 152. The pulleys 178 and 179 are belt connected with the motor pulley 153 and pulley 156, respectively, and are of a variable speed type. That is, the corresponding faces of each pulley 178 and 179 are axially movable away from each other in response to the operating tension or pressure on the belts in engagement therewith. The upper end 186 of the rocker arm 182 is connected to one end of a chain or strap 187 which passes through a pulley 188 and has its opposite end connected to the upper end 189 of a control lever 191. A shaft 192 for rotatably supporting the lever arm 191 is journaled in the frame structure 123 and carries also a control pulley 193 having a groove in the peripheral portion thereof. The pulley 193 is provided with angularly spaced stops 194 and 196, which are relatively adjustable radially of the pulley for operative engagement with the control lever 191. A chain or belt 197 positioned in the peripheral groove of the pulley 193 is connected at one end to the carriage portion 172 and at its opposite end to a coil spring 198, which is secured as at 199 to a latch or hook mounted on the frame structure 123. A second coil spring 201 is also connected at one end to the catch 199, its opposite end being connected to the end 186 of the rocker arm 182.

As indicated in Fig. 16, the carriage 133 is in its starting position which is defined by engagement of the portion 172 with a stop member 202 adjustably mounted on the frame structure 123. This position defines also the starting or circumferential position of the cutter 58 on the plate 31. On starting of the motor 151, the screw shaft 168 is driven, through the previously described transmission system, to move the carriage 133 toward the right as viewed in Figs. 16 and 18. By virtue of the chain connection 187 this carriage movement rotates the pulley 193 in a clockwise direction, as also viewed in Figs. 16 and 18, against the tension pressure of the spring 198. With the carriage 133 in its starting position, the stop 196 on the pulley 193 engages the lower end 203 of the control lever 191. Pulley 193 thus also moves the lever 191 in a clockwise direction. Since the lever end 189, which is connected to the chain 187, is arranged to move upwardly on rotation of the pulley 193, the rocker arms 182 and 183 are pivotally moved to the left as seen in Fig. 16 whereby to correspondingly move the pulleys 178 and 179. This movement of the pulley assembly 154, as is best seen in Fig. 17, increases the tension in the belt connection between the motor pulley 153 and the pulley 178. This increased tension axially moves the corresponding faces of the pulley 178 away from each other whereby to decrease the pulley ratio between the pulleys 153 and 178 in an obvious manner. The rotational speed of the pulley 178 and hence of the pulley shaft 181 is thus correspondingly decreased. However, the tension in the belt connecting the pulleys 156 and 179 is decreased so that the corresponding faces of the pulley 179 are axially moved together to increase the pulley ratio between the pulleys 156 and 179. By virtue of the relative diameters of the pulleys 178 and 179, the pivotal movement of the pulley assembly 154 to the left increases the rotational speed of the pulley 156 and hence the rotational speed of the shaft 158, which is in operative driving engagement with both the power shaft 132 and the screw shaft 168. It is thus seen that when the carriage 133 is uniformly moved toward the right as viewed in Figs. 16 and 18, the control mechanism 191—193 pivotally moves the pulley assembly 154 to the left whereby to uniformly and relatively increase the rotational speeds of both the supporting tables 149 and the screw shaft 168.

This uniform increase in speed continues until the lever 191 is in a substantially vertically upright or neutral position, at which time the pressure of the spring 201, as applied through the chain 187 pulls the lever 191 in a clockwise direction at a rate faster than the speed of rotation of the pulley 193. With the pulling of the lever 191 beyond its neutral position by the spring 201, the lever end 203 is disengaged from the stop 196 while the end 189 engages the stop 194. This downward movement of the lever end 189 permits the pulley assembly 154 to be pivotally moved toward the right to the position shown in Fig. 18. The tension in the belt connection between the pulleys 156 and 179 is thus increased whereby to decrease the driving ratio between such pulleys, while the ratio between the pulleys 153 and 178 is increased. This change in the above-noted pulley ratios decreases the rotational speeds of both the power shaft 132 and screw shaft 168. Since this decrease in speed occurs immediately as the lever 191 passes its neutral position, the drop in the rotational speed of the table 149 is readily observed for a purpose to be later explained. On movement of the carriage 133 back to its starting position against the stop 202 the spring 201 returns the lever 191 to its starting position shown in Fig. 16, with the lever end 203 in abutting engagement with the stop 196.

As illustrated in Figs. 14, 15, 16, and 18, the supporting table 149 for the plate 31 is adapted for the cutting of a coil of elliptical shape. This table is shown in detail in Figs. 24 and 25, and includes a flat upper base member 204 secured to a lower base member 206. It is contemplated that the member 204 be provided in wood or other light-weight material so as to reduce the weight of the table to a minimum. Clips 207 on the top of the table hold the plate 31 in place during the operation of the machine. The base member 206 is constructed of a suitable metal and serves as a mounting for an elliptical rack 208, which is secured to the lower side of the table. In setting up the table 149 on the machine, one of the circular end or loop portions of the rack 208 is assembled in meshing engagement with the driving gear 129 on a vertical shaft 127 as shown in Fig. 15, the rack being of a thickness sufficient to slidably engage the stationary table or bed 126. The gear 129 is of a selected size relative to the circular end portion of the elliptical rack 208, such that it meshes with the rack, but substantially eliminates any wobble or pivotal movement of the table 149 relative thereto. That is, the gear 129 not only serves to rotate the table 149 but also acts to guide the table during its rotation in a manner to follow the elliptical contour of the rack 208. In one form of the table 149 the gear 129 is formed with sixty teeth while the circular or loop end portion of the elliptical rack is formed with thirty-six teeth. This tooth ratio provides for a self-locking engagement between the gear and the rack so that the rack closely follows the gear for all operating positions of the table 149.

Additional guiding of the table 149 to follow the elliptical contour of the rack 208 is obtained by a guide rail 209 (Fig. 15) which is mounted longitudinally of the stationary table 126. The rail 209 is of segmental form with a roller 211 being positioned between adjacent segment ends and on a center line of the gear 129. In rotating the table 149, therefore, the rack 208 is in meshing engagement on one side with the gear 129 and in rolling engagement with the roller 211 on the side thereof immediately opposite the zone of meshing engagement. The table 149 on the initial engagement of a flat side of the rack 208 with the guide rail 209 tends to be thrown away from the rail, whereby to deviate from the elliptical contour of the rack. A substantially immediate engagement of the rack with the guide rail is obtained by means of a spring catch lever 212 which is positioned near each roller 211. The lever 212 is arranged for latching engagement with a holding bar 213 which is arranged longitudinally on each side of the table 149 and at the bottom thereof. As shown in Fig. 15, the table 149 is rotated in the direction indicated by the arrows. The catch lever 212 and each bar 213 are relatively positioned so that engagement of the catch lever with a bar does not occur until after a flat side of the rack 208 is in a position to be substantially completely engaged by the guide rail 209. Since the table is held by the catch lever 212 during the engagement of the flat side of the rack with the guide rail it is positively retained for elliptical rotation corresponding to the contour of the elliptical rack 208.

Removal of the supporting table 149 from the machine is obtained by simply lifting the table to disengage the rack 208 from the gear 129. In the making of a circular spiral coil the supporting table shown in Figs. 23 and 26 is substituted for the supporting table 149. The table 214 includes an upper base 216 and a lower base 217. An annular flanged portion 218 is mounted centrally of the lower side of the table 214 and is of a size adapted to fit within a circular recess 209 formed in the upper face of the gear 129. The table 214 is retained on the gear by a screw 221 which extends through an aperture formed at the center of the table and is threadably secured in the end of shaft 127. The screw 221 normally retains the gear 129 in position on the shaft 127 as indicated in Fig. 25. The machine is thus quickly changed to make either oval or circular coils by simply manipulating the single screw 221 and mounting either a table 149 or 214 on the gear 129. It is to be understood of course that the construction of each table 149 and 214 is identical for the complete machine and that the machine operates to turn out a plurality of either the oval or the circular shaped coils.

When making a run of a desired coil size and shape it is readily apparent that any change in the length of the coil winding affects directly the electrical characteristics of the coil. Thus a uniform construction and hence uniform electrical characteristics for a particular run of coils are obtained by positively setting the cutter 58 to the same starting position and cutting the groove 32 to a predetermined length. Setting of the cutter 58 to its starting position is accomplished in part by the stop 202, previously mentioned. However, it is apparent that any changes in the meshing engagement of the worm 169 and the screw shaft 168 at the starting position directly varies the traverse of the cutter 58 on the plate 31. Any changes in this meshing engagement are eliminated in the present invention by the worm gear assembly 222 (Figs. 15 and 27) which includes the worm gear 169 and an adjustable hub portion 223 arranged between the flat plate projections 224 and 226 at the carriage extension 171. A screw 227 extends through the plate 224 for threaded engagement in the hub 223, but off center therefrom. A second screw 228 in coaxial alignment with the screw 227 extends through the plate 226 and is threadably secured at one end in the hub 223, its opposite end being frictionally clamped in a lever arm 229. On loosening of the screw 227 and release of the lever 229, the hub portion and worm are freely movable relative to the screw shaft 168 for varying the degree of back lash between the gear and the screw shaft. Adjustment of the gear to reduce this back lash to a minimum is accomplished by rotating the hub 223 which is eccentrically mounted on the screw 227, tightening of the screw 227 frictionally locking the hub on the plate 224 to maintain the adjusted clearance. This tightening of the screw 227, however, does not affect the gear 169 which remains freely rotatable on the hub portion 223. In the moving of the carriage 133 by the screw shaft 168 the lever 229 is operated to frictionally lock the gear 169 to the plate 226. Thus on rotation of the screw 168 the gear is threaded along the screw shaft whereby to move the carriage 133 thereon. When it is desired to move the carriage 133 to its starting position against the stop 202, the lever 229 is operated to release the gear 169 to permit the gear to rotate on the screw shaft 168. Thus on the return of the carriage 133 to its starting position against the stop 202, the gear 169 continues in meshing engagement with the screw shaft 168. By virtue of this continuous meshing engagement the operation of the lever 229 to frictionally lock the gear 169, therefore, does not alter in any way the position of the carriage frame relative to the stop 202, and hence the starting position of the cutter 58. The cutter 58 is thus positively set at all times to the same starting position since the occurrence of any possible lost motion or take up in back lash in the carriage driving system is entirely eliminated. This starting position for all of the cutters 58 is accomplished by a uniform and simultaneous movement of all portions of the carriage structure 133. Thus as shown in Figs. 14 and 15 a gear rack 231 is mounted on each of the frame structures 123 and 124, each rack being in meshing engagement with a pinion 232 mounted at each end of a shaft 233 rotatably supported longitudinally of the carriage 133. Since the meshed tooth portions are of a relatively large width back lash is reduced to a minimum so that a positive movement of the entire carriage occurs during all times of its operation.

In the operation of the apparatus of Figs. 14 to 27, let it be assumed that elliptical coils are to be made. Since setting of the cutter assembly 42 and wire guiding element 137 for each supporting table 149 is the same, only one table and its associated structure will be referred to in the following description. The carriage 133 is moved to its starting position, as shown in Fig.

16, with the portion 172 in abutting engagement with the stop 202, the location of the stop 202 on the frame portion 123 being determined in correspondence with the size of the coil to be made. With the carriage 133 in its starting position the control assembly 191—193 is adjusted in correspondence with such position to provide for a speed control of the table 149 over the entire length of the groove 32 to be cut. The cutter 58 and wire guiding element 137 are pivotally moved to their rest positions, indicated in Fig. 19, to provide sufficient clearance above the table 149 for positioning and clamping the plate 31 thereon. These rest positions of the cutter 58 and element 137 are maintained by coil springs 234 and 236, respectively. Each spring 236 (Figs. 19 and 22) for the guiding element 137 is connected at one end to the carriage mounting bracket 134 and at its opposite end to a supporting arm 141. The construction and arrangement of the springs is such that the spring pressure moves the arms 141 upwardly when the element 137 is in its rest position, and acts to hold the element 137 in engagement with the plate 31 when the element is in its operated position. It is seen, therefore, that a neutral position occurs intermediate the two operating positions so that the direction of the spring pressure is reversed on passage of the element 137 over this neutral position. The springs 234 operate in a similar manner on the cutter assembly 42. The cutter assembly 42 further includes a switch 237 for the motor 61 which is arranged to open the motor circuit when the cutter 58 is in its rest position. This is accomplished by having the switch positioned at the top of the assembly 42 so as to engage a portion of the mounting bracket 134 when the assembly is in its uppermost position. The switch 237 and motor 61 are connected in parallel with the motor 151 so that closing of a main control switch (not shown) closes the circuit of the motor 151 and supplies power to the terminals of the switch 237. However, although the motor 151 is energized, the table 149 and carriage 133 remain inoperative due to the declutched position of the clutching mechanism 177.

On pivotal movement of the cutter assembly 42 downwardly the switch 237 is closed to energize the motor 61 whereby to rotate the cutter 58. With the cutter positioned in cutting engagement on the mounting plate 31 the clutch mechanism 177 is actuated to operate the table 149 and carriage 133. On rotation of the table 149 for about two revolutions the apparatus is again declutched and the guiding element 137 is moved into its operating position relative to the cutter 58 as is shown in Figs. 21 and 22. It is to be understood, of course, that the cutter 58 and element 137 are positioned relative to the plate 31 in a manner similar to that hereinabove fully described for the cutter 58 and disc 71 of the apparatus in Figs. 1 through 7. That is, the aixs of the shaft 59 of the motor 61 is initially positioned in vertical parallel alignment with one of the axes of the elliptical rack 208 so that the cutter 58 on movement of the carriage 133 is moved transversely of the plate 31 along the selected axis. Since the axes of the element 137 and the shaft 59 are also in alignment, the element 137 is similarly moved across the plate 31 on the line of the selected axis.

As previously noted, the guiding end of the element 137 is in sliding engagement with the plate 31 and operates to position the winding 34 within the groove 32 so that the uppermost portion of the winding is flush with the top surface of the plate 31. In some instances, such as where the mounting plate 31 is formed of a material which is readily injured by an excessive pressure of the element 137 thereon, it is desirable that the pressure on the element be adjustable. By virtue of the springs 236, the pressure exerted on the element arms 141, increases as the arms are moved closer to the mounting plate 31. By adjusting the element 137 vertically within its holder 142, the position of the arms 141 relative to the plate 31 is changed, whereby to vary the spring pressure exerted by the element on the plate. However, the pressure on the arms 141 must at all times be sufficient to overcome any tendency of the winding 34 to lift the element 137 from the plate 31 during the unwinding of the wire from the spool 147. If the winding 34 is of fine wire sufficient friction must be applied to the spool 147 to eliminate any backlash or snagging of the wire. This friction is obtained by a spring tensioned arm 238 (Fig. 16) which is supported on a pivot member 239 for the spool 147 in a manner to apply a brake on the spool. In the event the winding 34 is of relatively heavy wire the tendency to backlash is appreciably reduced so that the braking of the spool 147 is correspondingly reduced. Since the braking action directly affects the tendency of the wire to raise the element 137 from the plate 31 during the unwinding of spool 147, the frictional pressure of the element on the plate and the spring brake on the spool 147 are relatively adjusted to produce a desired tension in the winding 34. As indicated in Fig. 24, the loose end of the winding 34 may be attached to pegs or like means 241 which are mounted in the table 149 near one side of the mounting plate 31.

On movement of the element 137 to its operated position the clutch mechanism 177 is actuated to operate the table 149 and the carriage 133, the cutting of the groove 32 and the laying of the winding 34 therein proceeding concurrently as the carriage moves across the plate 31. As the cutter 58 nears the completion of its operation the control lever 191 is tripped or pulled beyond its vertical or neutral position by the spring 201 whereby to reduce the rotational speed of the table 149. This progress of the cutting operation is indicated to the operator by this drop in table speed. Substantially immediately with this reduction in the speed of the table the cutter 58 is lifted out of engagement with the plate 31 and to its rest position by means now to be described, the rotation of the cutter 58 being stopped on engagement of the switch 237 with the mounting bracket 134.

The cutter assembly 42 near the switch 237 is pivotally connected to one end of a chain or a strap 241, the opposite end of the chain being connected to a peripheral portion of a shaft 242 rotatably supported on the carriage 133 and extending longitudinally thereof. As is best shown in Figs. 15 and 22, the chain 241 is entirely slack when the cutter 58 is in cutting engagement with the plate 31, so that all of the pressure of the springs 236 is applied on the collars 62 and 63 during the cutting operation. A spring 243 is connected at one end to a portion of the carriage structure 133 and at its opposite end to a grooved pulley 244 mounted on the shaft 242, the spring being arranged so as to be placed under tension when the shaft is rotated in a counterclockwise direction as viewed in Fig. 22. Thus with the spring 243 in its wound position the shaft 242 is tensioned to rotate in a clockwise direction as seen in Fig. 22. The tension of the spring 243 in its wound position is retained by a reset lever 246 which is mounted on the shaft 242 and releasably engageable with a plunger 247 for a normally deenergized solenoid 248. On energization of the solenoid 248, therefore, the plunger is actuated to release the lever 246 whereby to permit a free rotation of the shaft 242 in a clockwise direction as seen in Fig. 22. By virtue of the chain connection 241 this direction of rotation of the shaft winds the chain about the shaft to in turn raise the cutter assembly 42 to its rest position.

Energization of the solenoid 248 is accomplished by a switch 249 which is adjustably mounted on the frame structure 123 and is arranged to be closed by the carriage 133 when the groove 32 is of a desired length. Since the control assembly 191—193 operates to maintain a substantially uniform rate of cutting the groove 32, the tripping of the lever 191 to reduce the rotation of speed of the table 149 thus occurs substantially simultaneously with the closing of the switch 249 by the carriage 133. It is thus seen that the neutral position of the lever 191 and the adjusted position of the switch 249 on the frame portion 123 are set relative to each other. The slowing down of the table 149 is utilized to facilitate the laying of the winding 34 in the groove 32 on lifting of the cutter assembly 42 to its rest position. With a slow table rotation the table revolutions are easily counted by the operator. As was previously noted the element 137 is moved into its operating position after the cutter has completed about two loops of the groove 32. These two loops corresponding to about two revolutions of the table are counted by the operator to complete the laying of the winding 34 in the groove 32, it being understood that the element 137 remains in operation after the cutter is lifted to its rest position. On completion of the wire laying operation the clutch lever 176 is actuated to stop the operation of the apparatus, and the winding 34 is cut prior to a lifting of the element 137 to its rest position. The completed coil is then removed from the supporting table 149.

In arranging the apparatus for the cutting of another coil, the lever 229 is operated to release the frictional locking of the worm gear 169 by the plate portion 226 and the carriage 133 is manually moved to its starting position, after which the gear 169 is again frictionally locked by the lever 229. By virtue of the springs 198 and 201 associated with the control assembly 191—193, this assembly is returned to its starting position concurrently with the positioning of the carriage 133. Since the reset lever for the shaft 242 is mounted directly thereon, the return of the lever into engagement with the solenoid plunger 247 winds the spring 243 about the pulley 244 whereby to again tension the shaft 242 for rotation in a clockwise direction as viewed in Fig. 22. It is to be understood, of course, that the shaft 242 operates only to lift the cutter assembly 42 above its neutral position, since the springs 236 alone retain the cutter assembly 42 in its rest position. On positioning of a mounting plate 31 on the supporting table 149, the above-described operation of the apparatus is repeated.

In the making of a coil having a spiral circular loop the table 214 is substituted for the table 149. Apart from this change the operation of the apparatus is identical for both the making of elliptical and circular coils. It is to be understood that the wire-laying assembly described in Figs. 11, 12 and 13, is also applicable to the apparatus in Figs. 14 to 27.

By virtue of the high-speed rotation of the cutter 58, which in actual practice varies from about 5,000 to 10,000 R. P. M., considerable dust or fine cut particles are formed during the cutting operation. Since this dust is objectionable to the operator of the machine, it is contemplated that the carriage 133 be of hollow construction and provided with suitable inlet openings therein for the connection of flexible tubing portions 251, the free ends of which are supported on arms 252 mounted on each of the bracket members 134. (Figs. 14, 15 and 19.) The inlet ends of the tubes 251 are thus positioned adjacent the cutter 58 when in its operating position and movable with the cutter 58 over the entire length of the groove 32. A suction blower or the like (not shown) may be suitably attached to an outlet 253 in the top portion of the carriage 133 so that the cut particles from the cutter 58 are immediately drawn into the tube portions 251, and through the outlet 253 for disposition.

The invention thus provides an improved apparatus for making coils of flat type efficiently and at a minimum of cost so as to make such coils commercially available at a relatively cheap cost. So far as is known the forming of a spiral groove having sound unbroken edges in a shreddable material such as cardboard or the like was never commercially accomplished prior to applicant's invention.

It is to be understood that only preferred embodiments of the present invention have been illustrated and described herein and that modifications and alterations thereof can be made which are within the full intended scope of the invention as defined by the appended claims.

I claim:

1. Apparatus for making a coil including a rotary table for supporting a mounting member for said coil, rotatable cutting means for forming a groove in a side of said member, means for supporting said cutting means in a cutting engagement with said mounting member, means for moving said cutting means across said mounting member and in a direction substantially axially of said cutting means to provide for the cutting of a spiral groove, and wire laying means movable with said cutter and operable to position a wire in the groove formed by said cutter.

2. Apparatus for cutting a spiral groove in one side of a supporting member for a coil of flat type, a rotary table for supporting said member, means for rotating said table, rotatable cutting means having a cutting edge engageable with said one side, means for rotating said cutting means at a substantially uniform speed, means for moving said cutting means at a uniform rate across said one side of the supporting member in a direction from the circumference toward the center thereof, means for varying the rotational speed of said table, and control means in operative engagement with said cutter moving means and speed varying means, said control means being actuated by movement of said cutter moving means toward the center of said supporting member to uniformly increase the rotational speed of said table so that the said groove is cut at a substantially uniform rate over its complete length.

3. Apparatus for cutting a spiral groove in one side of a mounting member for a coil of flat type including a rotary table for supporting said member in a horizontal position, means for rotating said table including a driving motor and a driven shaft, rotatable cutting means engageable with said one side, means for rotating said cutting means at a substantially constant speed, means supporting said cutting means for movement relative to said mounting member, means for moving said supporting means at a uniform rate in a direction substantially axially of said cutting means and toward the center of said member, axially movable rotary members operatively connected with said shaft and motor, means supporting said rotary members for pivotal movement between said motor and shaft, said pivotal movement axially moving said rotary members to vary the driving ratio between said motor and shaft, and rotary control means operatively connected to said cutter supporting means and pivotal supporting means, with movement of said cutter supporting means toward the center of said mounting member actuating said control means to pivotally move said rotary members in a direction to increase the rotative speed of said rotary table, so that said groove is cut at a uniform rate over its entire length.

4. Apparatus for making a coil of elliptical contour having a mounting plate of substantially flat form, a stationary table, a rotary table for holding said mounting plate having a rack of substantially elliptical shape secured to the lower side thereof, said rotary table being supported on said stationary table with said rack in slidable engagement with said stationary table, driving means for said rotary table rotatably supported in said stationary table, said driving means including a rotary member arranged between said two tables and operatively engageable with said rack to elliptically rotate said rotary table, a rotary cutter for cutting a groove in said plate, means for supporting said cutter in cutting engagement with said plate, means for moving said supporting means across said plate and in a direction substantially axially relative to said cutter, said cutter movement coacting with the elliptical rotation of said rotary table to provide for the cutting of an elliptical spiral groove in said coil plate, and wire laying means movable with said cutter and operable to position a wire in the bottom of said groove.

5. Apparatus for making a coil having a substantially flat mounting plate, a rotary member for supporting said plate, means for rotating said member, rotary cutting means for cutting a groove in said mounting plate, means pivotally supporting said cutting means for pivotal movement into and out of a cutting position with said plate, said cutting means in its cutting position being inclined inwardly toward the center of said mounting plate, means for moving said pivotal supporting means in a direction substantially axially of said cutting means and toward the center of said mounting plate to provide for the cutting of a spiral groove, and wire laying means including a pivoted guide member for positioning the wire within said groove, said guide member being carried by said pivotal supporting means but being pivotally movable independently of said cutting means.

6. In apparatus for making coils having a mounting plate with a winding positioned in a spiral groove formed in one side thereof, the combination of a rotary table for holding said plate in a substantially horizontal position, means for rotating said table, rotary cutting means for cutting said groove, means supporting said cutting means for pivotal movement into and out of a cutting position with said plate, means for laying the winding in said groove including a wire guiding element, means supporting said guiding element for pivotal movement into and out of operative engagement with said plate, and means for simultaneously moving said two supporting means across said plate in a direction substantially axially relative to said cutting means, said two supporting means being arranged to relatively position and retain said guiding element and cutter means on said plate to provide for substantially the complete cutting of said groove concurrently with a laying of the winding therein.

7. In apparatus for cutting a spiral groove in a member of substantially flat form for a wire device in which the wire is retained in the groove by the locking action of the edges thereof, the combination of a rotary supporting table for said flat member, rotary cutting means including a mounting shaft, means supporting said cutting means for movement into and out of a cutting position with said flat member, means for moving said cutting means across said flat member in a direction substantially axially relative to said shaft, and rotary members mounted on said shaft and arranged on opposite sides of said cutting means, said rotary members being of a different diameter than said cutting means and having their peripheries in operative engagement with said flat member, with said difference in diameters defining the depth of said groove.

8. In apparatus for cutting a spiral groove in a supporting member of substantially flat form for a coil in which the coil winding is retained in the groove by the locking action of the edges thereof, the combination of a rotary supporting table for said supporting member, rotary cutting means including a mounting shaft, means pivotally supporting said cutting means for pivotal movement into and out of a cutting position with said supporting member, said cutting means in said cutting position being angularly inclined relative to said supporting member, means for moving said cutting means across said supporting member and in a direction substantially axially relative to said shaft, and rotary members mounted on said shaft and arranged on opposite sides of said cutting means, said rotary members having their peripheral portions correspondingly sloped in a direction axially thereof and in operative engagement with said supporting member, said sloped peripheral portions determining the angular inclination of said cutting means relative to said supporting member, said cutting means being of a different diameter than said rotary members, with said difference in diameters defining the depth of said groove.

9. In apparatus for making coils having a flat mounting plate with a spiral groove in one side thereof, and including a rotary table for holding said mounting plate, the combination of means for laying a winding in said groove including a carriage member, a guiding element for directing the winding into said groove, said guiding element being in slidable engagement with said plate at said groove, means pivotally supporting said guiding element on said carriage for pivotal movement into and out of engagement with said plate, variable tension means for said guiding element connected at one end to said carriage and at its opposite end to said supporting means, said variable tension means being operable to retain said guiding element in engagement with said plate, means for adjustably moving said guiding element in said pivotal supporting means, with adjustment of said guiding element varying the pivotal movement of said supporting means relative to said plate to vary the pressure applied on said guiding element by said tension means, and means for moving said carriage across said plate.

10. In apparatus for making coils having a substantially flat mounting plate with a spiral groove formed in one side thereof for receiving and holding the coil winding, the combination of means for cutting said groove to a predetermined length including frame means, a rotating table for supporting said plate, a carriage member movably supported on said frame means above said table, rotary cutting means for cutting said groove, means pivotally supporting said cutting means on said carriage member for pivotal movement to rest and cutting positions, means for moving said carriage member across said plate in a direction such that said cutting means is moved from the circumference toward the center of said plate, adjustable stop means mounted on said frame means and engageable with said carriage member to define the start of cutting for said cutting means, a rotary member rotatably supported on said carriage, means operatively connecting said cutting means and rotary member, said connecting means being arranged to pivotally lift said cutting means to said rest position on rotation of said rotary member in one direction, tension means for rotating said member in said one direction, means for releasably retaining said rotary member under tension when said cutting means is in a cutting position including magnetic means mounted on said carriage, and normally open switch means for said magnetic means adjustably mounted on said frame means and arranged to be closed on engagement with said carriage, said engagement serving to energize said magnetic means to release said rotary member in said one direction to provide for the lifting of said cutting means from its cutting position.

11. In apparatus for making coils having a mounting plate with a spiral groove formed in a side thereof for receiving and retaining the coil winding, including frame means, a carriage slidably supported on said frame means and a drive screw in operative driving engagement with said carriage, the combination of means for cutting said groove to a predetermined length so that the electrical characteristics of said coils will be substantially uniform, including rotary groove cutting means supported on said carriage, a holding table for said coil plate rotatably supported in said frame means, said carriage being movable across said plate in a direction such that said cutting means is moved from the circumference toward the center of said plate, stop means on said frame means engageable with said carriage to define the starting position of said cutting means, means for rendering said cutting means inoperative on movement of said carriage a predetermined distance away from said stop means, a worm gear mounted on said carriage and in meshing engagement with said drive screw, said gear having an eccentrically mounted hub portion, for adjusting the backlash in said meshing engagement, and means for frictionally locking said gear in an adjusted position, with release of said locking means permitting the rotation of said gear relative to said screw to retain said meshed engagement on the return movement of said carriage against said stop means, said continuous meshing engagement serving to maintain said carriage member against said stop means on locking of said gear for driving by said drive screw.

12. In apparatus for making coils having a mounting plate with a spiral groove formed in one side thereof for the retention of the coil winding, and including frame means and a table rotatably supported in said frame means for holding said coil plate, the combination of groove cutting and wire laying means including a carriage member movably supported on said frame means, a rotary cutter having its axis positioned substantially in a plane passing through the center of said coil plate, means pivotally supporting said cutter on said carriage for pivotal movement to its rest and cutting positions, means for linearly moving said carriage member in a direction substantially parallel to said plane to move said cutter from the circumference toward the center of said coil plate, a guide member for directing the winding into said groove, engageable with the coil plate at said groove and angularly displaced from said cutter in a following position relative to said groove, said guide member having a pivot portion formed thereon, a lever member pivotally connected to said carriage member and to a portion of said frame means laterally displaced to one side of the path of movement of said carriage, means pivotally connecting said guide member to said lever, and a second means pivotally connecting said guide member to said carriage member, said pivot portion being common to said two pivotally connecting means, with said lever and two pivotally connecting means coacting to progressively adjust said guiding member to follow in said groove and adjacent said cutter as the cutter is moved toward the center of the coil plate by said carriage member.

13. In apparatus for producing a spiral groove in one side of a substantially flat member; the combination for producing said spiral groove which comprises means for supporting said flat member, rotary groove cutting means arranged for groove cutting engagement with said flat member, means for producing relative movement between said supporting means and said cutter so that said cutter produces a spiral groove in the surface of said flat member, and means for changing the speed of relative movement between said flat member and said supporting means as said groove is cut in said member.

14. In apparatus for producing a spiral groove in one side of a substantially flat member; the combination for producing said spiral groove which comprises means for supporting said flat member, rotary groove cutting means arranged for groove cutting engagement with said flat member, means for producing relative movement between said supporting means and said cutter so that said cutter produces a spiral groove in the surface of said flat member, and means for uniformly changing the speed of relative movement between said flat member and said cutter as said groove is cut in said member.

15. In apparatus for producing a spiral groove in one side of a substantially flat member; the combination for producing said spiral groove which comprises means for supporting said flat member, rotary groove cutting means arranged in groove cutting engagement with said flat member, means for producing relative movement between said supporting means and said cutter so that said cutter produces a spiral groove of constantly decreasing radius in the surface of said flat member, and means for constantly increasing the speed of relative movement between said supporting means and said cutter as the cutting of said groove progresses.

16. In apparatus for producing a spiral groove in one side of a substantially flat member; the combination for producing said spiral groove which comprises means for supporting said flat member, rotary groove cutting means arranged for groove cutting engagement with said flat member, means for producing relative movement between said supporting means and said cutter so that said cutter produces a spiral groove in the surface of said flat member, and means responsive to a predetermined amount of relative movement between said supporting means and said cutter for changing the speed of said relative movement.

17. In apparatus for producing a spiral groove in one side of a substantially flat member; the combination for producing said spiral groove which comprises means for supporting said flat member, rotary groove cutting means arranged for groove cutting engagement with said flat member, means for producing relative movement between said supporting means and said cutter so that said cutter produces a spiral groove in the surface of said flat member, and means responsive to a predetermined amount of relative movement between said supporting means and said cutter for producing disengagement of said cutter and said flat member.

18. In apparatus for producing a spiral groove in one side of a substantially flat member; the combination for producing said spiral groove which comprises means for supporting said flat member, rotary groove cutting means arranged for groove cutting engagement with said flat member, means for producing relative movement between said supporting means and said cutter so that said cutter produces a spiral groove in the surface of said flat member, means responsive to a predetermined amount of relative movement between said supporting means and said cutter for changing the speed of said relative movement, and means also responsive to said predetermined amount of relative movement between said supporting means and said cutter for producing disengagement of said cutter and said flat member.

19. In apparatus for producing a spiral groove in one side of a substantially flat member; the combination for producing said spiral groove which comprises means for supporting said flat member, rotary cutting means including a shaft and a cutter carried by said shaft for groove cutting engagement with said flat member, means for producing relative movement between said supporting means and said cutter so that said cutter produces a spiral groove in the surface of said flat member, and a rotary member carried on said shaft to one side of said cutter, said rotary member having a different diameter than said cutter and having its periphery in engagement with the surface of said flat member, whereby the difference between the diameters of said rotary member and said cutter defines the depth of said groove.

20. In apparatus for making a wire device which comprises a substantially flat supporting member provided with a spiral groove in one side thereof in which a wire is disposed; the combination for producing said spiral groove and for laying said wire which comprises means for supporting said flat member, rotary groove cutting means arranged for groove cutting engagement with said flat member, means for producing relative movement between said supporting means and said cutter so that said cutter produces a spiral groove in the surface of said flat member, a wire feed mechanism for laying a wire in said groove as the cutting of said groove proceeds and including an element engageable with said flat member to guide the wire into said groove, and means supporting said cutting means and said guide element for movement into and out of engagement with said flat member independently of each other.

21. In apparatus for making a wire device which comprises a substantially flat supporting member provided with a spiral groove in one side thereof in which a wire is disposed; the combination for producing said spiral groove and for laying said wire which comprises means for supporting said flat member, rotary groove cutting means arranged for groove cutting engagement with said flat member, means for producing relative movement between said supporting means and said cutter so that said cutter produces a spiral groove in the surface of said flat member, a wire feed mechanism for laying a wire in said groove as the cutting of said groove proceeds and including an element engageable with said flat member to guide the wire into said groove, means supporting said cutting means and said guide element for movement into and out of engagement with said flat member independently of each other, and means responsive to a predetermined amount of relative movement between said cutting means and said supporting means for automatically disengaging said cutting means from said flat member without disengaging said guide element from said flat member.

22. In apparatus for making a wire device which comprises a substantially flat supporting member provided with a spiral groove in one side thereof for receiving a wire; the combination for feeding a wire into said groove which includes a guide element rotatable about an axis substantially normal to said flat member and having a groove through which the wire is fed into said spiral groove, means for producing relative movement between said flat member and said guide element such that the wire is continuously fed into said spiral groove as said relative movement proceeds, and means controlled in accordance with said relative movement for rotating said guide element about said axis as said relative movement proceeds.

23. In apparatus for producing a spiral groove in one side of a substantially flat member; the combination for producing said spiral groove which comprises means for supporting said flat member, a rotary groove cutter arranged for groove cutting engagement with said flat member, means for producing relative movement between said supporting means and said cutter, and means for so guiding said cutter and said supporting means in their relative movement that an elliptical spiral groove of constantly decreasing radius is cut in said flat member.

24. In apparatus for producing a spiral groove in one side of each of a plurality of substantially flat members; the combination for concurrently producing the spiral grooves in a plurality of said flat members which comprises supporting and cutting units each including a member for supporting a flat member and a rotary groove cutter arranged for groove cutting engagement with a flat member carried by the supporting member of the same unit, means common to said units for producing relative movement between each supporting member and its associated cutter, and means including a mechanism common to said units for so guiding said cutters and said supporting members in the relative movement therebetween that a spiral groove is produced by each cutter in the flat member carried by the supporting member of the same unit.

25. In apparatus for producing a spiral groove in one side of each of a plurality of substantially flat members; the combination for concurrently producing the spiral grooves in a plurality of said flat members which comprises supporting and cutting units each including a member for supporting a flat member and a rotary groove cutter arranged for groove cutting engagement with a flat member carried by the supporting member of the same unit, means common to said units for producing relative movement between each supporting member and its associated cutter, means including a mechanism common to said units for so guiding said cutters and said supporting members in the relative movement therebetween that a spiral groove is produced by each cutter in the flat member carried by the supporting member of the same unit, and means common to said units for uniformly changing the speed of relative movement between said flat members and the cutters acting thereon as the cutting of said grooves progresses.

26. In apparatus for producing a spiral groove in one side of each of a plurality of substantially flat members; the combination for concurrently producing the spiral grooves in a plurality of said flat members which comprises supporting and cutting units each including a member for supporting a flat member and a rotary groove cutter arranged for groove cutting engagement with a flat member carried by the supporting member of the same unit, means common to said units for producing relative movement between each supporting member and its associated cutter, and means including a mechanism common to said units for so guiding said cutters and said supporting members in the relative movement therebetween that a spiral groove is produced by each cutter in the flat member carried by the supporting member of the same unit, and means common to said units and responsive to a predetermined amount of relative movement between said supporting members and their associated cutters for producing disengagement of said cutters and said flat members.

HARRY P. VON KNAUF.